United States Patent
Montazeri et al.

(10) Patent No.: US 11,099,726 B1
(45) Date of Patent: Aug. 24, 2021

(54) GROUP-BASED COMMUNICATION SYSTEM AND APPARATUS CONFIGURED TO MANAGE USER-DEFINED CHANNEL LABELS ASSOCIATED WITH A PLURALITY OF GROUP-BASED COMMUNICATION CHANNELS

(71) Applicant: SLACK TECHNOLOGIES, INC., San Francisco, CA (US)

(72) Inventors: Michael Montazeri, Brooklyn, NY (US); Kyle Stetz, Berkeley, CA (US); Matthew Hodgins, Toronto (CA)

(73) Assignee: Slack Technologies, Inc., San Francisco, CA (US)

( * ) Notice: Subject to any disclaimer, the term of this patent is extended or adjusted under 35 U.S.C. 154(b) by 0 days.

(21) Appl. No.: 16/399,349

(22) Filed: Apr. 30, 2019

(51) Int. Cl.
*G06F 3/0484* (2013.01)
*G06F 3/0482* (2013.01)

(52) U.S. Cl.
CPC ........ *G06F 3/04847* (2013.01); *G06F 3/0482* (2013.01); *G06F 2203/04803* (2013.01)

(58) Field of Classification Search
CPC ............... G06F 3/04847; G06F 3/0482; G06F 2203/04803
See application file for complete search history.

(56) References Cited

U.S. PATENT DOCUMENTS

| | | | | |
|---|---|---|---|---|
| 6,630,944 B1 * | 10/2003 | Kakuta | ................ | G06Q 10/10 715/758 |
| 9,256,761 B1 * | 2/2016 | Sahu | ................ | G06F 16/90335 |
| 9,940,394 B1 | 4/2018 | Grant et al. | | |
| 10,104,181 B1 * | 10/2018 | Rao | ...................... | H04L 12/1818 |
| 10,331,303 B1 * | 6/2019 | Gurtin | .................... | G06F 3/0482 |
| 10,547,466 B2 * | 1/2020 | Christian | ............ | H04L 65/4076 |
| 10,585,562 B2 * | 3/2020 | Gurtin | .................... | H04L 51/046 |
| 10,771,270 B2 * | 9/2020 | Sullivan | .................. | H04L 51/22 |
| 2004/0235520 A1 * | 11/2004 | Cadiz | ................... | H04M 1/2473 455/557 |
| 2005/0108345 A1 * | 5/2005 | Suzuki | .................... | H04L 51/00 709/206 |

(Continued)

OTHER PUBLICATIONS

Matsumoto, T. et al., "Chocoa Communicator—A New Communication System Based on Awareness and Text Communications—", Fujitsu Sci. Tech. J., 36, 2, (Dec. 2000) 154-161.

(Continued)

*Primary Examiner* — Tadesse Hailu
(74) *Attorney, Agent, or Firm* — Lee & Hayes, P.C.

(57) ABSTRACT

Various embodiments of the present invention are directed to an improved group-based communication apparatus that is configured to efficiently manage group-based communication interfaces associated with one or more group-based communication workspaces. The group-based communication apparatus is configured to create and assign user-defined channel labels in association with one or more of a plurality of group-based communication channels. The user-defined channel labels may be displayed to a sidebar label focus interface component of a sidebar pane of the group-based communication interfaces. The user-defined channel labels may be combined with other data of the group-based communication workspaces to assemble one or more work graph data structures.

22 Claims, 16 Drawing Sheets

(56) References Cited

U.S. PATENT DOCUMENTS

| | | | |
|---|---|---|---|
| 2005/0198128 A1* | 9/2005 | Anderson | G06F 40/166 709/204 |
| 2009/0157513 A1* | 6/2009 | Bonev | G06Q 10/109 705/14.69 |
| 2010/0223345 A1* | 9/2010 | Gupta | G06Q 10/109 709/206 |
| 2010/0262666 A1* | 10/2010 | Kalu | G06Q 10/107 709/206 |
| 2012/0260195 A1* | 10/2012 | Hon | G06F 16/44 715/753 |
| 2013/0046830 A1* | 2/2013 | MacDonald | H04L 51/04 709/206 |
| 2014/0052548 A1 | 2/2014 | Dokken, Jr. | |
| 2015/0046259 A1* | 2/2015 | Hicken | G06Q 30/0256 705/14.54 |
| 2015/0288632 A1* | 10/2015 | Zheng | H04L 51/32 709/206 |
| 2016/0048900 A1* | 2/2016 | Shuman | G06Q 30/0204 705/7.33 |
| 2016/0077698 A1* | 3/2016 | Gunderson | H04L 51/04 715/753 |
| 2017/0126689 A1* | 5/2017 | Lloyd | H04L 61/1594 |
| 2017/0169800 A1 | 6/2017 | Greco et al. | |
| 2018/0097754 A1* | 4/2018 | Jiang | G06F 3/04845 |
| 2018/0197144 A1* | 7/2018 | Frank | H04W 12/08 |
| 2018/0212903 A1* | 7/2018 | Rose | H04L 51/04 |
| 2018/0287982 A1 | 10/2018 | Draeger et al. | |
| 2019/0058680 A1* | 2/2019 | Rosania | H04L 51/16 |
| 2019/0200177 A1* | 6/2019 | Greene | H04L 51/22 |

OTHER PUBLICATIONS

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

Rebecca Walberg, "Email biggest office waste of time: survey", National Post, At FP10, LEXISNEXIS, https://advance.lexis.com/api/permalink/96268e3f-26ad-48ac-a98f-6c39804ebded/?context=1000516, (dated Mar. 4, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Mike Issac, "Slack, a Start-Up With an App to Foster Business Collaboration, Is Valued at $1.1 Billion", The New York Times Blogs (BITS), LEXISNEXIS, https://advance.lexis.com/api/permalink/3eb84b34-a8f9-4d7d-9573-89d9598a4963/?context=1000516>. (dated Oct. 31, 2014) 2 pages.

Michael Carney, "Slack is thriving on a cocktail of whimsy and great timing", PANDODAILY, LEXISNEXIS, https://advance.lexis.com/api/permalink/dd2d4ee5-2ddf-4d3a-a1d9-3bcee5e38b74/?context=1000516, (dated Feb. 6, 2015, 2:12 AM) 3 pages.

Matthew Ingram, "Flickr co-founder launches Slack, an all-in-one messaging tool designed to kill email forever", GIGAOM, LEXISNEXIS, https://advance.lexis.com/api/permalink/0b676b7c-aec3-4560-861e-d030d1dd008c/?context=1000516, (dated Feb. 12, 2014, 7:03 PM), 2 pages.

Jonathan Vanian, "Why these startups think chat apps are the next big thing in workplace collaboration", GIGAOM, LEXISNEXIS, https://advance.lexis.com/api/permalink/e83778c8-09c8-43aa-9ba0-88526283de69/?context=1000516, (dated Aug. 1, 2014, 5:45 PM) 4 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Adrienne LaFrance, "The Triumph of Email", ATLANTIC ONLINE, LEXISNEXIS, https://advance.lexis.com/api/permalink/32d7ddd9-d4c1-4a73-86f7-08ab5842fde6/?context=1000516, (dated Jan. 6, 2016) 5 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

"Die, Email, Die! A Flickr Cofounder Aims to Cut Us All Some Slack", READWRITEWEB, LEXISNEXIS, https://advance.lexis.com/api/permalink/33dd79e2-90f5-409d-ae27-5a2c7e86bf31/?context=1000516>. (dated Aug. 14, 2013, 4:15 PM) 2 pages.

* cited by examiner

FIG. 3A

PDE
○ Jonathan Barrows

⌂ All Channels

Construction - build - Anderson Proj.
Construction - permit - Anderson Proj.
Construction - QA - Anderson Proj.
Construction - site plan - Anderson Proj.
Design - drafting - Anderson Proj.
Design - drafting - Simpson Proj.
Design - feasability - Anderson Proj.
Design - feasability - Simpson Proj.
Design - planning - Anderson Proj.
Design - planning - Simpson Proj.
Electrical - design - Anderson Proj.
Electrical - design - Simpson Proj.
Electrical - fabricate - Anderson Proj.
Electrical - fabricate - Simpson Proj.
HR - compliance
HR - offboarding
HR - onboarding
HR - payroll
HR - personnel reviews
HR - policy
IT - Network design
Masonary - build - Anderson Proj.
Masonary - build - Simpson Proj.
Masonary - design - Anderson Proj.
Masonary - design - Simpson Proj.
Procurement - Anderson Proj.
Procurement - Simpson Proj.

Masonary - design - Anderson Proj.
1 & 182 | T-shaped foundation for new mall?

Jonathan Barrows - 1:31 PM
Would a T-shaped foundation be feasable for the proposed retail mall?

Daniel Johnson - 1:32 PM
A frost protected shallow foundation might prove less expensive.

Amy Krazinsky - 1:33 PM
That's true, however a T-shaped foundation will likely be needed to best support the height of the building.

*Enter Message Text*

| Manage Labels | 725 | | |
|---|---|---|---|
| Name | Channels | Type | Notifications |
| ▢ Retail | 6 | Shared | Mute ⌄ |
| ⊟ T-shaped foundation | 8 | Private | Mentions only ⌄ |
| ▢ Johnson General Contractors | 4 | Shared | All activity ⌄ |
| ▢ Florida hurricane compliance | 6 | Shared | Mute ⌄ |
| 735 | 745 | 755 | 765 |

GROUP-BASED COMMUNICATION SYSTEM AND APPARATUS CONFIGURED TO MANAGE USER-DEFINED CHANNEL LABELS ASSOCIATED WITH A PLURALITY OF GROUP-BASED COMMUNICATION CHANNELS

BACKGROUND

Systems have been provided for facilitating messaging communications among a plurality of users across client devices connected with a centralized messaging system. Applicant has identified a number of problems associated with conventional messaging systems. Through applied effort, ingenuity, and innovation many deficiencies of such systems have been solved by developing solutions that are structured in accordance with the embodiments of the present invention, many examples of which are described in detail herein.

BRIEF SUMMARY

Various embodiments of the present invention are directed to an improved group-based communication apparatus that is configured to efficiently manage group-based communication interfaces associated with one or more group-based communication workspaces. The group-based communication apparatus is configured to create and assign user-defined channel labels in association with one or more of a plurality of group-based communication channels. The user-defined channel labels may be displayed to a sidebar label focus interface component of a sidebar pane of the group-based communication interfaces. The user-defined channel labels may be combined with other data of the group-based communication workspaces to assemble one or more work graph data structures as discussed in detail herein.

One embodiment is directed to a group-based communication apparatus configured to manage group-based communication channels of a group-based communication interface comprising a sidebar pane and a message pane, the group-based communication apparatus comprising at least one processor and at least one memory, the at least one memory having computer-coded instructions therein, wherein the computer-coded instructions are configured to, in execution with the at least one processor, cause the group-based communication apparatus to: receive a user identifier; access a plurality of permitted group-based communication channels based on the user identifier; cause rendering of the plurality of permitted group-based communication channels to the sidebar pane based on group-defined titles for the plurality of permitted group-based communication channels; receive, from a client device, a sidebar label focus request comprising a user-defined channel label identifier; identify a label-focused channel set of the plurality of permitted group-based communication channels based on the user-defined channel label identifier; and cause rendering of the label-focused channel set to the sidebar pane of the group-based communication interface.

In one embodiment, the group-based communication apparatus is further configured to: cause ordering of the label-focused channel set within the sidebar pane of the group-based communication interface based on the group-defined titles for the plurality of group-based communication channels.

In another embodiment, the label-focused channel set is a sub-set of the plurality of permitted group-based communication channels. In another embodiment, the user-defined channel label identifier comprises an author identifier matching the user identifier. In still other embodiments, the user-defined channel label identifier comprises an author identifier that does not match the user identifier.

In some embodiments, the group-based communication apparatus is further configured to: receive a user-defined channel label share request comprising an author identifier, a user-defined channel label identifier, and a share recipient identifier; and cause transmission of a user-defined channel label share message to a second client device associated with the share recipient identifier, wherein the user-defined channel label share message comprises the author identifier and the user-defined channel label identifier.

In some embodiments, the group-based communication apparatus is further configured to: receive a user-defined channel label share confirmation from the second client device associated with the share recipient identifier; and in response to receiving the user-defined channel label share confirmation, cause storage of the user-defined channel label identifier to a channel label identifier repository associated with the share recipient identifier.

In one embodiment, the group-based communication apparatus is further configured to: access a second plurality of permitted group-based communication channels based on the share recipient identifier; cause rendering of the second plurality of permitted group-based communication channels to a second sidebar pane of a second group-based communication interface based on the group-defined titles; receive, from the second client device, a second sidebar label focus request comprising the user-defined channel label identifier; identify a second label-focused channel set of the second plurality of permitted group-based communication channels based on the user-defined channel label identifier; and cause rendering of the second label-focused channel set to the second sidebar pane of the second group-based communication interface.

In another embodiment, the group-based communication apparatus is further configured to: cause rendering of a user-defined label selection interface component in association with the rendering of the permitted group-based communication channels; receive a user-defined label selection command in response to user engagement with the user-defined label selection interface component, the user-defined label selection command comprising a user-defined label text string, the user identifier, and a selected group-based communication channel identifier associated with at least one of the permitted group-based communication channels; determine a new user-defined channel label identifier for association with the user-defined label text string; and cause storage of the new user-defined channel label identifier to a channel label identifier repository associated with the user identifier.

In one embodiment, the group-based communication apparatus is configured to: cause storage of the user-defined label text string and the selected group-based communication channel identifier to the channel label identifier repository in association with the new user-defined channel label identifier.

In another embodiment, the group-based communication apparatus is further configured to: receive, from the client device, a second sidebar label focus request comprising the new user-defined channel label identifier; identify a new label-focused channel set of the plurality of permitted group-based communication channels based on the new user-defined channel label identifier; and cause rendering of the new label-focused channel set to the sidebar pane of the group-based communication interface.

In one embodiment, the group-based communication apparatus is further configured to: receive, from the client device, a sidebar default request; and cause rendering of the plurality of permitted group-based communication channels to the sidebar pane based on the group-defined titles for the plurality of permitted group-based communication channels. In some embodiments, the sidebar label focused request is generated in response to user engagement with a sidebar label focus interface component of the group-based communication interface.

Still other embodiments are directed to a group-based communication apparatus configured to manage group-based communication channels of a group-based communication interface, wherein each of the group-based communication channels comprises a group-defined title that is used by the group-based communication apparatus to organize the group-based communication channels within a sidebar pane of the group-based communication interface, the group-based communication apparatus comprising at least one processor and at least one memory, the at least one memory having computer-coded instructions therein, wherein the computer-coded instructions are configured to, in execution with the at least one processor, cause the group-based communication apparatus to: receive, from a client device, a user-defined channel label search request comprising a user-defined label query term and a user identifier; identify a permitted group-based communication channel set associated with the user identifier; query a user-defined channel label set associated with the permitted group-based communication channel set based on the user-defined label query term to identify a query-focused label identifier results set; identify a label-focused channel set of the permitted group-based communication channel set based on the query-focused label identifier results set; and output the label-focused channel set to the client device.

In one embodiment, the group-based communication apparatus is further configured to cause rendering of the label-focused channel set to the sidebar pane of the group-based communication interface.

Other embodiments of the present invention are directed to a group-based communication apparatus configured to manage group-based communication channels of a group-based communication interface comprising a sidebar pane and a message pane, the group-based communication apparatus comprising at least one processor and at least one memory, the at least one memory having computer-coded instructions therein, wherein the computer-coded instructions are configured to, in execution with the at least one processor, cause the group-based communication apparatus to: receive a user identifier; access a plurality of permitted group-based communication channels based on the user identifier; cause rendering of the plurality of permitted group-based communication channels to the sidebar pane based on group-defined titles for the plurality of permitted group-based communication channels; cause rendering of a user-defined label selection interface component in association with the rendering of the permitted group-based communication channels; receive a user-defined label selection command in response to user engagement with the user-defined label selection interface component, the user-defined label selection command comprising a user-defined label text string, the user identifier, and a selected group-based communication channel identifier associated with at least one of the permitted group-based communication channels; determine a user-defined channel label identifier for association with the user-defined label text string; and cause storage of the user-defined channel label identifier to a channel label identifier repository associated with the user identifier and the selected group-based communication channel identifier.

In one embodiment, the group-based communication apparatus is further configured to: receive, from the client device, a sidebar label focus request comprising the user-defined channel label identifier; identify a label-focused channel set of the plurality of permitted group-based communication channels based on the user-defined channel label identifier; and cause rendering of the label-focused channel set to the sidebar pane of the group-based communication interface.

In another embodiment, the selected group-based communication channel identifier is a selected set of group-based communication channel identifiers respectively associated with a labeled set of the permitted group-based communication channels. In some embodiments, the group-based communication apparatus is further configured to: receive, from the client device, a sidebar label focus request comprising at least one of the selected set of user-defined channel label identifiers; identify a label-focused channel set of the plurality of permitted group-based communication channels based on the at least one of the selected set of user-defined channel label identifiers; and cause rendering of the label-focused channel set to the sidebar pane of the group-based communication interface.

In still other embodiments, the user-defined channel label identifier comprises an author identifier matching the user identifier. The group based communication apparatus is further configured to: receive a user-defined channel label share request comprising the author identifier, the user-defined channel label identifier, and a share recipient identifier; cause transmission of a user-defined channel label share message to a second client device associated with the share recipient identifier, wherein the user-defined channel label share message comprises the author identifier and the user-defined channel label identifier.

In some embodiments, the group-based communication apparatus is further configured to: receive a user-defined channel label share confirmation from the second client device associated with the share recipient identifier; and in response to receiving the user-defined channel label share confirmation, cause storage of the user-defined channel label identifier to a channel label identifier repository associated with the share recipient identifier.

In still other embodiments, the group-based communication apparatus is further configured to: access a second plurality of permitted group-based communication channels based on the share recipient identifier; cause rendering of the second plurality of permitted group-based communication channels to a second sidebar pane of a second group-based communication interface based on the group-defined titles; receive, from the second client device, a sidebar label focus request comprising the user-defined channel label identifier; identify a label-focused channel set of the second plurality of permitted group-based communication channels based on the user-defined channel label identifier; and cause rendering of the label-focused channel set to the sidebar pane of the second group-based communication interface.

In one embodiment, the group-based communication apparatus is configured to: access a second plurality of permitted group-based communication channels based on the share recipient identifier; cause rendering of the second plurality of permitted group-based communication channels to a second sidebar pane of a second group-based communication interface based on the group-defined titles; cause rendering of a second user-defined label selection interface component in association with the rendering of the second permitted group-based communication channels; receive a second user-defined label selection command in response to user engagement with the second user-defined label selection interface component, the second user-defined label selection command comprising a second user-defined label text string, the share recipient identifier, and a second selected group-based communication channel identifier associated with at least one of the second permitted group-based communication channels; determine a second user-defined channel label identifier for association with the second user-defined label text string; and cause storage of the second user-defined channel label identifier to a second channel label identifier repository associated with the share recipient identifier and the second selected group-based communication channel identifier.

In another embodiment, the group-based communication apparatus is configured to: receive a second user-defined label selection command in response to user engagement with the user-defined label selection interface component, the second user-defined label selection command comprising a second user-defined label text string, the user identifier, and the selected group-based communication channel identifier associated with the at least one of the permitted group-based communication channels; determine a second user-defined channel label identifier for association with the second user-defined label text string; and cause storage of the second user-defined channel label identifier to the channel label identifier repository associated with the user identifier and the selected group-based communication channel identifier.

In still other embodiments, a group-based communication apparatus configured for generating user-relevant content, the group-based communication apparatus comprising at least one processor and at least one memory, the at least one memory having computer-coded instructions therein, wherein the computer-coded instructions are configured to, in execution with the at least one processor, cause the group-based communication apparatus to: receive a user identifier; identify a group-based communication channel set associated with the user identifier; identify a user-defined channel label identifier set associated with the user identifier; access a group-based communication object corpus based on the group-based communication channel set, wherein each object of the group-based communication object corpus comprises metadata and body content data; and assemble the group-based communication object corpus into a work graph data structure based on the metadata, the body content data, and the user-defined channel label identifier set.

BRIEF DESCRIPTION OF THE SEVERAL VIEWS OF THE DRAWINGS

Reference will now be made to the accompanying drawings, which are not necessarily drawn to scale, and wherein:

FIG. 3A shows an example group-based communication interface configured in accordance with one embodiment;

FIG. 3B shows an example group-based communication interface comprising a sidebar label focus interface component configured in accordance with one embodiment;

FIG. 3C shows an example group-based communication interface configured to illustrate user engagement of a sidebar focus interface component in accordance with one embodiment;

FIG. 3D shows an example group-based communication interface comprising a label share recipient identification interface configured in accordance with one embodiment;

FIG. 4 shows an example group-based communication interface comprising a label-focused channel set interface configured in accordance with one embodiment;

FIG. 5 shows an example group-based communication interface comprising a user-defined label creation interface configured in accordance with one embodiment;

FIG. 6A shows an example group-based communication interface comprising a label share preview interface element configured in accordance with one embodiment;

FIG. 6B shows an example group-based communication interface comprising a preview label-focus interface component configured in accordance with one embodiment;

FIG. 7 shows an example group-based communication interface comprising a user-defined channel label management interface configured in accordance with one embodiment;

DETAILED DESCRIPTION

Figure 1:
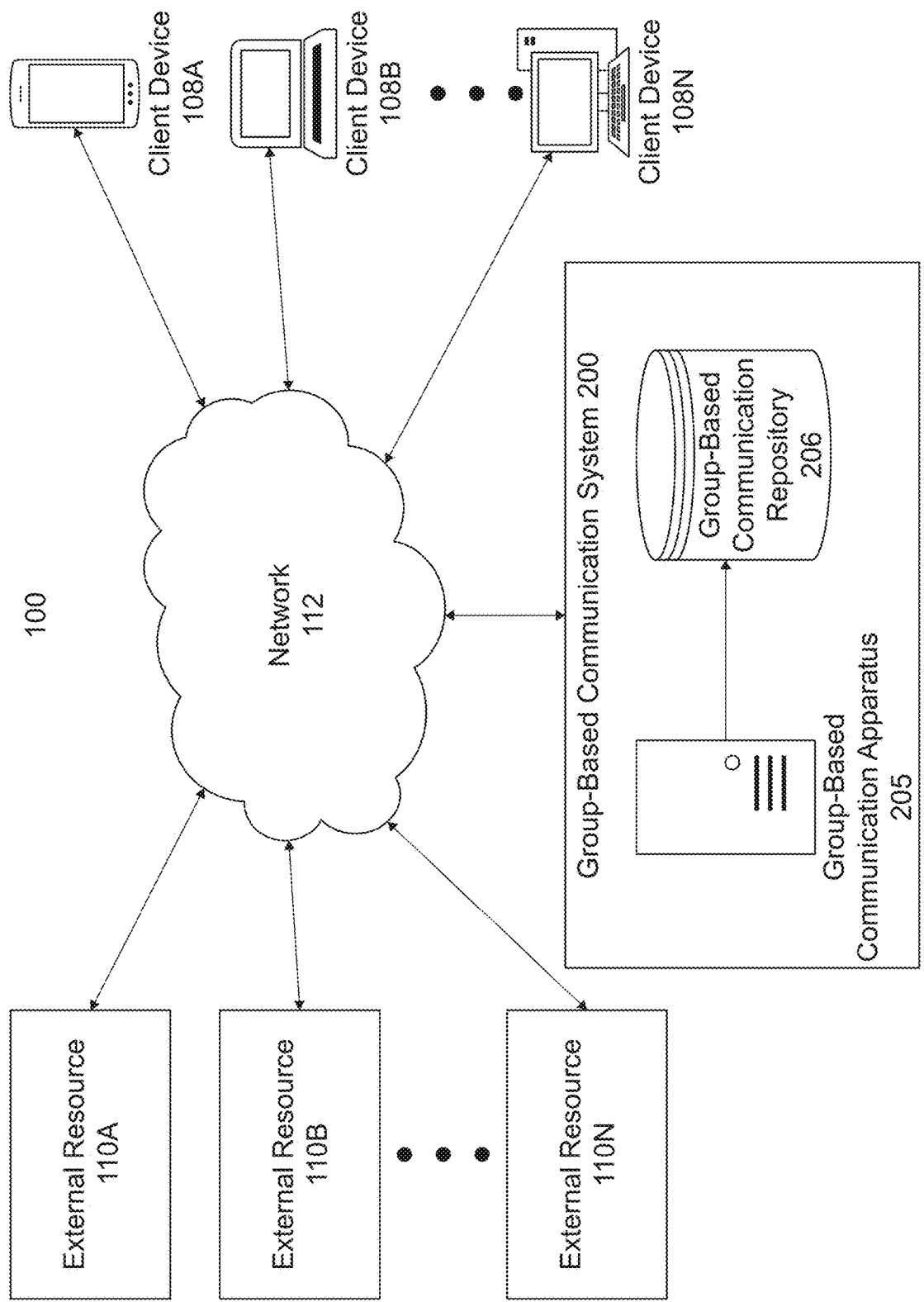
FIG. 1 shows a schematic view of a group-based communication system in communication with client devices and external resources according to various embodiments of the present invention.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

In a group-based communication system, users may communicate with one another in a myriad of ways. For example, a user may be a member of one or more group-based communication workspaces, each group-based communication workspace dedicated to a particular organizational group or team having a defined member list (i.e., a defined list of authenticated user accounts).

Each group-based communication workspace includes a plurality of group-based communication channels. It is not uncommon for an enterprise user to be a member of four or more group-based communication workspaces with each group-based communication workspace comprising dozens or hundreds of group-based communication channels. Upon accessing a group-based communication interface to interact with just one of the group-based communication workspaces, a user may be presented with a flurry of new activity including tens or hundreds of new messages, file updates, or other group-based communication object updates (e.g., changes, modifications, notifications) that are distributed across dozens of group-based communication channels. This volume of new activity can quickly become overwhelming and/or distracting.

Each indication of new activity may not be of equal importance or relevance to a given user. Also, the new activity indications are distributed among a listing of group-based communication channels that are organized within a sidebar pane of a group-based communication interface based on group-defined titles. Such group-defined titles are established at creation of each respective group-based communication channel and do not evolve or mature with changing channel content. Thus, such group-defined titles are not terribly meaningful to a given user and often are not suggestive of recent content/messages posted to the respective channels.

Various embodiments of the present invention are directed to an improved group-based communication apparatus that is configured to efficiently manage group-based communication interfaces associated with one or more group-based communication workspaces. The group-based communication apparatus is configured to store personalized user-defined channel labels in association with one or more of the plurality of group-based communication channels.

In one example, one or more custom user-defined channel labels (e.g., retail, shopping mall, T-shaped foundation, Roman fountain) are stored by the group-based communication apparatus in association with a group-based communication channel in addition to its group-defined title (e.g., #Menlo Park 0420 Development). Such custom user-defined channel labels (e.g., T-shaped foundation) may also be stored in association with a variety of other group-based communication channels as deemed appropriate by a label-authoring user. The group-based communication apparatus is thus configured to allow a user to identify a label-focused channel set by querying a plurality of group-based communication channels using a user-defined label identifier (e.g., 00201) associated with a desired user-defined channel label (e.g., T-shaped foundation). Such label-focused channel set may then be rendered to the sidebar pane of the group-based communication interface to ensure that label-related group-based communication objects are efficiently located for access.

In another example, the group-based communication apparatus is configured to allow one or more user-defined channel labels authored by one user to be shared with one or more other users. Such user-defined channel label sharing provides a vibrant ecosystem for group-based communication channel topic tagging that makes channel content more searchable and accessible to group-based communication system users. This is particularly true when a group-based communication object corpus is drawn from a group-based communication channel set and used, in conjunction with associated user-defined labels, to assemble a work graph data structure. This work graph data structure may be illustrative of relationships between various users, group-based communication channels, user-defined channel labels, other group-based communication objects. Such a work graph data structure may be leveraged via machine-learning and/or artificial-intelligence configurations and/or models to present users with expansive, relevant results to search queries (e.g., with an integrated ranking hierarchy to indicate levels of relevance to the user's search query), to automatically connect or introduce users of one or more group-based communication workspaces with other users and/or with automatically curated topical content, and/or the like.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "user" should be understood to refer to an individual, group of individuals, business, organization, and the like. The users referred to herein are enabled to access a group-based communication system using client devices. Each user of the group-based communication system is associated with at least one group identifier (defined below).

"Group-based" is used herein to refer to a system, channel, communication, message, or virtual environment that has security sufficient such that it is accessible only to a defined group of users (i.e., group members sharing a common group identifier). The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, users, group-based communication channels, etc., with specific groups of a group-based communication system as defined below.

The term "group-based communication system" refers to a communications software platform and associated hardware that is configured to support and maintain a plurality of group-based communication workspaces and all associated functionality. Group-based communication system users are organized into organization groups (e.g., employees of different companies may embody separate organization groups) and each group interacts with the system via a respective group-based communication workspace. For example, the group-based communication system might support, among others, a Slack Corporation group-based communication workspace and an ACME Corporation group-based communication workspace. Example group-based communication systems comprise supporting servers, client devices, and third party resources.

The terms "user profile," "user account," and "user account details" refer to information of a group-based communication system that is associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user profile details can include a subset designation of user credentials, such as, for example, login information for the user including the user's username and password. In some embodiments, the user profile also includes one or more "user-defined channel label identifiers" that are ASCII (American Standard Code for Information Interchange) text, pointers, memory addresses, or other unique identifiers that are configured to indicate a label-focused channel set when the group-based communication system uses such user-defined label identifiers to query a plurality of permitted group-based communication channels. In other embodiments, the user profile may include a pointer or other cross-reference data element for identifying a channel label identifier repository that is configured to store one or more user-defined channel label identifiers.

The term "user identifier" refers to one or more items of data by which a user and this user's corresponding user account may be identified within a group-based communication system. For example, a user identifier may comprise ASCII text, a pointer, a memory address, or other unique identifier. A "share recipient identifier" is an example form of user identifier that is used by the group-based communication system when routing transmission of a user-defined channel label share message. An "author identifier" is an example form of user identifier that is used by the group-based communication system to identify the creator (e.g., an authoring user or author) of a selected user-defined channel label identifier.

The terms "group identifier" or "team identifier" refer to one or more items of data by which a group within a group-based communication system may be identified. For example, a group identifier may comprise ASCII text, a pointer, a memory address, and the like. Group identifiers are used to distinguish group-based communication channels, messages, files, members, etc., of associated with one group-based communication workspace from another group-based communication workspace. For example, in one embodiment, a group identifier may be stored as a 64 bit unsigned integer and represented externally (outside of memory) as a base-34 encoded string.

The term "group-based communication apparatus" refers to a software platform and associated hardware (e.g., server, etc.) that is configured to manage access to the various group-based communication workspaces (defined below) of the group-based communication system. The group-based communication apparatus is configured to access, maintain, and support application product logic of the group-based communication system and to access one or more data repositories such as a group-based communication repository.

The term "group-based communication workspace" refers to a virtual communications environment configured to facilitate user interaction with a group-based communication system. Each group-based communication workspace is accessible and viewable (as a group-based communication interface defined below) to a validated group of users, such as a group of employees of a business or organization (e.g., the Slack Corp. workspace would be accessible and viewable to the Slack employees however the ACME Corporation group-based communication workspace would not be accessible and viewable to Slack employees). The group-based communication workspace includes a plurality of group-based communication channels (e.g., a marketing channel, sales channel, accounting channel, etc.), which are defined herein. In various embodiments, user profiles sharing a common group identifier (defined below) form part of a common group-based communication workspace.

The term "group-based communication interface" is a graphical user interface of a group-based communication system that is configured to allow users to (e.g., group members) to view and engage a group-based communication workspace. A group-based communication interface is rendered to a client device based on data and instructions provided by the group-based communication system (e.g., the group-based communication apparatus). In some embodiments, such data and instructions are facilitated by a dedicated software application running on the client device. In other embodiments, such data and instructions are provided through a web browser running on the client device. Each group-based communication interface is visually configured to define a sidebar pane and a message pane. A "sidebar pane" is configured to display lists of group-based communication channels that are typically organized by group-defined titles (defined below). A "message pane" is configured to display one or more messages of a group-based communication channel upon user selection of such group-based communication channel from within the sidebar pane.

The term "group-based communication channel" refers to a virtual communications environment or feed that is configured to display messaging communications posted by channel members (e.g., validated users accessing the environment using client devices) that are viewable only to the members of the channel. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel. Group-based communication channels are typically organized in list form within the sidebar pane of the group-based communication interface based on group-defined titles. A "group-defined title" is a channel name or text string that is conceived and stored to a group-based communication repository at the time a group-based communication channel is created for common identification to all members of the group-based communication workspace. In many embodiments, group-defined titles are created based on a group-wide nomenclature/procedure so that group members may readily understand the purpose of any associated group-based communication channel. Example group-defined titles include: #accounting—audit 2018, #accounting—payroll, #HR—onboarding procedure, #food truck frenzy, and the like.

The terms "group-based communication channel identifier" or "channel identifier" refer to one or more items of data by which a group-based communication channel may be identified. For example, a group-based communication channel identifier may comprise ASCII text, a pointer, a memory address, and the like.

The term "group-based communication channel profile" refers to information of a group-based communication system that is associated with a group-based communication channel, including, for example, an array of user identifiers indicating channel membership, a channel administrator identifier, a group-defined title, one or more group identifiers for groups with which the group-based communication channel is associated, one or more external resource identifiers representing those external resources that have been authenticated for use in the group-based communication channel, a pinned channel file listing, a plurality of messages, and the like. In some embodiments, a group-based communication channel profile may also include one or more user-defined channel label identifiers for user-defined channel labels that are associated with a channel-at-issue and have been shared or published by label authors to members of the group-based communication channel and/or to members of the associated group-based communication workspace. In such embodiments, the group-based communication channel profile would not include user-defined channel label identifiers for user-defined channel labels that remain unshared or have been otherwise designated by label authors as private.

The terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a timestamp that identifies the time of the message, a group identifier, and a group-based communication channel identifier. Each of the foregoing identifiers may comprise ASCII text, a pointer, a memory address, and the like.

The term "group-based communication object" refers to electronic data objects or digital content objects specifically executable and/or otherwise accessible via the group-based communication system and/or at least one external resource. Group-based communication objects may be received at the group-based communication system by receiving those group-based communication objects conveyed to (pushed to) the group-based communication system, or the group-based communication system may retrieve (pull to) various group-based communication objects stored within accessible storage areas of one or more client devices, external resources, and/or the like. The group-based communication objects include body content data and metadata. The body content data of the group-based communication objects may be interpreted by the group-based communication apparatus to display or otherwise convey human-readable representations of information and/or computer-executable content that causes a particular client device to operate in a particular way. Specifics of certain group-based communication objects examples are discussed herein, however it should be understood that in certain embodiments, group-based communication objects may be embodied as messaging communications, emails, events, audio files, video files, document files, spreadsheet files, presentation files, tasks, and/or the like; as well as any contextual data corresponding therewith. Group-based communication objects may thus be non-personal (alternatively referred to as public) as they are exchanged between a plurality of users or otherwise made available to a plurality of users. Alternatively, group-based communication objects may be personal in nature (e.g., as defined by a portion of metadata associated with the group-based communication object), such that access to the content of the group-based communication object is limited to a single user (or a limited number of defined users). For example, group-based communication objects personal to a single user may encompass tasks or task lists defined personally by and for a particular user. Access to personal group-based communication objects may be limited to access requests associated with defined user identifiers. In certain embodiments, personal group-based communication objects may be represented as encrypted data when indexed in database storage areas and/or when included within work graph data structures including personal and non-personal group-based communication objects.

A "sending user identifier" is associated with a collection of messages that are sent by a particular user (e.g., sent by a client device associated with the particular user, user identifier, or user profile). These messages may be analyzed or parsed to determine context regarding the user (e.g., the user's expertise or interest in a topic may be determined based on the frequency of mention of the topic or key words associated with the topic within such messages). A sending user identifier may comprise ASCII text, a pointer, a memory address, and the like. A sending user identifier may also be appended to a user-defined channel label share message as discussed herein. An example sending user identifier is an author identifier in some embodiments discussed herein.

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access settings such that it is not generally accessible and/or searchable by other members of the group-based communication system (i.e., members associated with other group-based communication workspaces). For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "permitted group-based communication channel(s)" refers to one or more group-based communication channels and/or private group-based communication channels that have be approved or authenticated for access by a user (e.g., a user profile) associated with a selected user identifier. Such permitted group-based communication channels are commonly displayed as a list (i.e., organized by group-defined titles) within the sidebar pane of a group-based communication interface so that a user may assess this list and determine which of the permitted group-based communication channels to engage (i.e., access group-based communication messages of the selected group-based communication channel to review in the message pane) or otherwise interact with.

The term "label-focused channel set" refers to one or more group-based communication channels that are identified by a group-based communication system (e.g., user-defined channel label circuitry) by querying a permitted group-based communication channel set using a user-defined channel label identifier. Said differently, the label-focused channel set refers to a subset of a permitted group-based communication set wherein each channel of the label-focused channel set is associated with a common user-defined channel label identifier. In some embodiments, the label-focused channel set is rendered to the sidebar pane of a group-based communication interface.

The term "sidebar label focus request" refers to a message or instruction created by user-defined channel label circuitry of a group-based communication apparatus upon user engagement with a sidebar label focus interface component of a group-based communication interface. The sidebar label focus request includes a user-defined channel label identifier and is configured to trigger the group-based communication apparatus to identify a label-focused channel set from a permitted group-based communication channel set using the user-defined channel label identifier.

The term "user-defined label search request" refers to a message or instruction created by a client device upon user engagement with a user-defined label search interface component of a group-based communication interface. The user-defined label search request includes a user-defined label query term and is configured to trigger the group-based communication system to identify a label-focused channel set from a permitted group-based communication channel set using the user-defined label query term. The user-defined label query term is a keyword, topic, label, or other similar text string that may be deemed useful by a user to query a user-defined channel label set for identifying one or more user-defined channel label identifiers that are associated with the user-defined label query term. Such one or more user-defined channel label identifiers (i.e., a query-focused label identifier results set) may be used to identify a label-focused channel set.

The term "user-defined label share request" refers to a message or instructions created by a client device upon user engagement with a user-defined label share interface component of a group-based communication interface. The user-defined label share request comprises an author identifier, a user-defined channel label identifier, and a share recipient identifier. The user-defined label share request is configured to trigger the group-based communication system to transmit a user-defined channel label share message to a client device associated with the share recipient identifier. The user-defined channel label share message comprises the author identifier, the user-defined channel label identifier, and is configured to facilitate a recipient acceptance protocol that may culminate with storage of the user-defined channel label identifier to a channel label identifier repository associated with the share recipient identifier.

The term "external resource" refers to a refers to a software program, application, platform, or service that is configured to communicate with the group-based communication system for providing service to a client device via a group-based communication interface and/or via a group-based communication workspace. The external resource operates on a compiled code base or repository that is separate and distinct from that which supports the group-based communication system. In some embodiments, the external resource may communicate with the group-based communication system, and vice versa, through one or more application program interfaces (APIs). In some embodiments, the external resource receives tokens or other authentication credentials that are used to facilitate secure communication between the external resource and the group-based communication system in view of group-based communication system network security layers or protocols (e.g., network firewall protocols).

The term "external resource user identifier" refers to one or more items of data by which a user (or user profile) of an external resource may be uniquely identified by a group-based communication system. For example, an external resource user identifier may comprise ASCII text, a pointer, a memory address, and the like. One or more external resource user identifiers may be stored to a user profile of a group-based communication system along with other identifiers (e.g., user identifier, group identifiers, group-based communication channel identifiers, etc.). The external resource user identifier may be embodied in a format native to the external resource or may be structured in a format designated by the group-based communication system. Correlating one or more external resource user identifiers to a user account or user identifier of the group-based communication system allows the group-based communication system to link accounts from disparate external resources with a selected group-based communication system user account. The external resource user identifier may include an integer identifier, a universally unique identifier, an email address, a random string, and/or the like. In such a case, the group-based communication server may receive the external resource user identifier during the open authorization (OAuth) process.

The term "group-based communication repository" refers to the location, such as a memory device, where one or more user activity data logs are stored. The group-based communication repository may be a dedicated device and/or a part of a larger repository. The group-based communication repository may be dynamically updated or be static. For example, the user activity data logs may be uploaded to the group-based communication repository simultaneously with the creation of the user activity data logs. Alternatively, the user activity data logs may not be uploaded simultaneously with their creation and instead may be batch uploaded based on other factors, such as based on time intervals (e.g., uploads occur every 15 minutes), user initiation (e.g., user may press a button to initiate the upload), or the like. The group-based communication repository may be encrypted in order to limit unauthorized access of user activity data logs and associated engagement data. In some embodiments, the group-based communication repository may include data structures configured for storing user-defined channel label identifiers, user-defined channel labels, group-based communication channel identifiers, and other group-based communication system related data discussed herein. In one embodiment, the group-based communication repository may comprise a channel label identifier repository.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 200 via a communications network 112 using client devices 108A-108N. The group-based communication system 200 may comprise a group-based communication apparatus 205 in communication with at least one group-based communication repository 206. Users may further access features or services of one or more external resources 110A-110N through the group-based communication system 200.

Communications network 112 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 112 may include a cellular telephone, an 802.11, 802.16, 802.20, and/or WiMax network. Further, the communications network 112 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Websocket channel. In some embodiments, the protocol is JSON over RPC ("remote procedural call), JSON over REST ("Representational State Transfer")/HTTP ("HyperText Transfer Protocol"), and the like.

The group-based communication apparatus 205 may be embodied as a computer or computers. The group-based communication apparatus 205 may provide for receiving of electronic data from various sources, including but not necessarily limited to the client devices 108A-108N. For example, the group-based communication apparatus 205 may be operable to receive and post or transmit group-based messaging communications provided by the client devices 101A-101N.

The group-based communication repository 206 may be embodied as a data storage device such as a Network Attached Storage (NAS) device or devices, or as a separate database server or servers. The group-based communication repository 206 includes information accessed and stored by the group-based communication apparatus 205 to facilitate the operations of the group-based communication system 200. For example, the group-based communication repository 206 may include, without limitation, a plurality of messaging communications organized among a plurality of group-based communication channels, a plurality of group-defined titles, a plurality of user-defined label identifiers, and/or the like.

The client devices 108A-108N may be any computing device as defined above. Electronic data received by the group-based communication apparatus 205 from the client devices 108A-108N may be provided in various forms and via various methods. For example, the client devices 108A-108N may include desktop computers, laptop computers, smartphones, netbooks, tablet computers, wearables, and the like.

In embodiments where a client device 108A-108N is a mobile device, such as a smartphone or tablet, the client device 108A-108N may execute an "app" to interact with the group-based communication system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 108A-108N may interact with the group-based communication system 200 via a web browser. As yet another example, the client devices 108A-108N may include various hardware or firmware designed to interface with the group-based communication system 200.

Each of external resources 110A-110N represents an external system, resource, service, software application, computer, or the like, that a user of a client device associated with a corresponding group-based communication system user account may access via the group-based communication system 200. For example, the group-based communication system 200 may access an external resource via one or more application programming interfaces (APIs). An external resource may provide a specific service via a group-based communication interface of the group-based communication system 200. In one example, an external resource 110A may be a validated software source code repository, or the like, which members of a group-based communication workspace may collectively access as they collaborate to develop a new software application.

An external resource 110A-110N may be embodied in a variety of ways utilizing a variety of computing devices. For example, an external resource 110A-110N may be a computer or server remote from the group-based communication system 200 and accessible over the network 112 (e.g., over the Internet for example).

In some embodiments, the group-based communication system 200 is configured to access an external resource utilizing an external resource user identifier stored by the group-based communication system 200, such as in group-based communication repository 206. The external resource user identifier may include, or otherwise be associated with and retrievable together with, an external resource access token associated with the external resource and/or group-based communication system user account. A group-based communication system 200 may store one or more external resource user identifiers including or associated with an external resource access token(s) to enable API requests to the external resource.

In some embodiments of an exemplary group-based communication system 200, a message or messaging communication may be sent from a client device 108A-108N to a group-based communication system 200. In various implementations, the message may be sent to the group-based communication system 200 over communications network 112 directly by a client device 108A-108N, the message may be sent to the group-based communication system 200 via an intermediary such as a message server, and/or the like. For example, the client device 108A-108N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like.

In one embodiment, the client device 108A-108N may provide the following example message, substantially in the form of a (Secure) Hypertext Transfer Protocol ("HTTP(S)") POST message including eXtensible Markup Language ("XML") formatted data, as provided below:

```
POST/authrequest.php HTTP/1.1
Host: www.server.com
Content-Type: Application/XML
Content-Length: 667
<?XML version="1.0" encoding="UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL
                <digital_cert_link>www.mydigitalcertificate.com/
                JohnDoeDaDoeDoe@gmail.com/mycertifcate.
                dc</digital_cert_link>
            //OPTIONAL    <digital_certificate>_DATA_
                </digital_certificate>
        </user_account_credentials>
    </user_accounts_details>
    <client_details>MOS Client with App and Webkit
        //it should be noted that although several client
            details
        //sections are provided to show example variants of
            client
        //sources, further messages will include only on to
            save
        //space
        <client_IP>10.0.0.123</client_IP>
        <user_agent_string>Mozilla/5.0 (iPhone; CPU
            iPhone OS 7_1_1 like Mac OS X) AppleWebKit/
            537.51.2 (KHTML, like Gecko) Version/7.0
            Mobile/11D201    Safari/9537.53</user_agent_
            string>
        <client_product_type>iPhone6,1</client_product_
            type>
        <client_serial_number>DNXXX1X1XXXX</cli-
            ent_serial_number>
        <client_UDID>3XXXXXXXXXXXXXXXXXXX-
            XXXXXD</client_UDID>
        <client_OS>iOS</client_OS>
        <client_OS_version>7.1.1</client_OS_version>
        <client_app_type>app with webkit</client_app_
            type>
        <app_installed_flag>true</app_installed_flag>
        <app_name>nickname.app</app_name>
        <app_version>1.0</app_version>
        <app_webkit_name>Mobile Safari</client_webkit_
            name>
        <client_version>537.51.2</client_version>
    </client_details>
    <client_details>MOS Client with Webbrowser
        <client_IP>10.0.0.123</client_IP>
        <user_agent_string>Mozilla/5.0 (iPhone; CPU
            iPhone OS 7_1_1 like Mac OS X) AppleWebKit/
            537.51.2 (KHTML, like Gecko) Version/7.0
            Mobile/11D201    Safari/9537.53</user_agent_
            string>
        <client_product_type>iPhone6,1</client_product_
            type>
        <client_serial_number>DNXXX1X1XXXX</cli-
            ent_serial_number>
        <client_UDID>3XXXXXXXXXXXXXXXXXXX-
            XXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details>//Android Client with Webbrowser
        <client_IP>10.0.0.123</client_IP>
        <user_agent_string>Mozilla/5.0 (Linux; U; Android
            4.0.4; en-us; Nexus S Build/IMM76D)
            AppleWebKit/534.30 (KHTML, like Gecko) Ver-
            sion/4.0 Mobile    Safari/534.30</user_agent_
            string>
        <client_product_type>Nexus S</client_product_
            type>
        <client_serial_number>YXXXXXXXXZ</client_
            serial_number>
        <client_UDID>FXXXXXXXXX-XXXX-XXXX-
            XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details>//Mac Desktop with Webbrowser
        <client_IP>10.0.0.123</client_IP>
```

```
    <user_agent_string>Mozilla/5.0 (Macintosh; Intel
        Mac OS X 10_9_3) AppleWebKit/537.75.14
        (KHTML, like Gecko) Version/7.0.3 Safari/
        537.75.14</user_agent_string>
    <client_product_type>MacPro5,1</client_product_
        type>
    <client_serial_number>YXXXXXXXXZ</client_
        serial_number>
    <client_UDID>FXXXXXXXXX-XXXX-XXXX-
        XXXX-XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
  </client_details>
  <message>
    <message_identifier>ID_message_10</message_
        identifier>
    <team_identifier>ID_team_1</team_identifier>
    <channel_identifier>ID_channel_1</channel_iden-
        tifier>
    <body contents>That is an interesting invention. I
        have attached a copy our patent policy.</body
        contents>
    <attachments>patent_policy.pdf</attachments>
  </message>
</auth_request>
```

The group-based communication system 200 comprises at least one group-based communication apparatus 205 that may create a storage message based upon the received message to facilitate message indexing and storage in a group-based communication repository 206. In one implementation, the storage message may include data such as a message identifier, a group identifier, a group-based communication channel identifier, a sending user identifier, topics, responses, message contents (i.e., body contents), attachments, message hierarchy data, third party metadata, conversation primitive data, and/or the like. For example, the group-based communication apparatus 205 may provide the following example storage message, substantially in the form of a HTTP(S) POST message including XML-formatted data, as provided below:

```
POST/storage_message.php HTTP/1.1
Host: www.server.com
Content-Type: Application/XML
Content-Length: 667
<?XML version="1.0" encoding="UTF-8"?>
<storage_message>
    <message_identifier>ID_message_10</message_iden-
        tifier>
    <team_identifier>ID_team_1</team_identifier>
    <channel_identifier>ID_channel_1</channel_identi-
        fier>
    <sending_user_identifier>ID_user_1</sending_use-
        r_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <body contents>That is an interesting disclosure. I
        have attached a copy our patent policy.</body con-
        tents>
    <attachments>patent_policy.pdf</attachments>
    <conversation_primitive>
        conversation includes messages: ID_message_8,
            ID_message_9, ID_message_10, ID_message_11,
            ID_message_12
    </conversation_primitive>
</storage_message>
```

In embodiments, a sending user identifier may be associated with the message communication. In one implementation, the message may be parsed (e.g., using PHP—i.e., the script language derived from Personal Home Page Tools—commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:
  SELECT messageResponses
  FROM MSM_Message
  WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, a group-based communication workspace, a group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the group-based communication channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 206). In one implementation, a storage message may be sent from group-based communication apparatus 205 to facilitate indexing in group-based communication repository 206. In another implementation, metadata associated with the message may be determined and the message may be indexed in group-based communication repository 206. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 206 to facilitate searching. In one embodiment, the files may be indexed such that a company's or a group's files are indexed at a separate distributed repository.

Example Apparatus for Implementing Embodiments of the Present Disclosure

Figure 2:
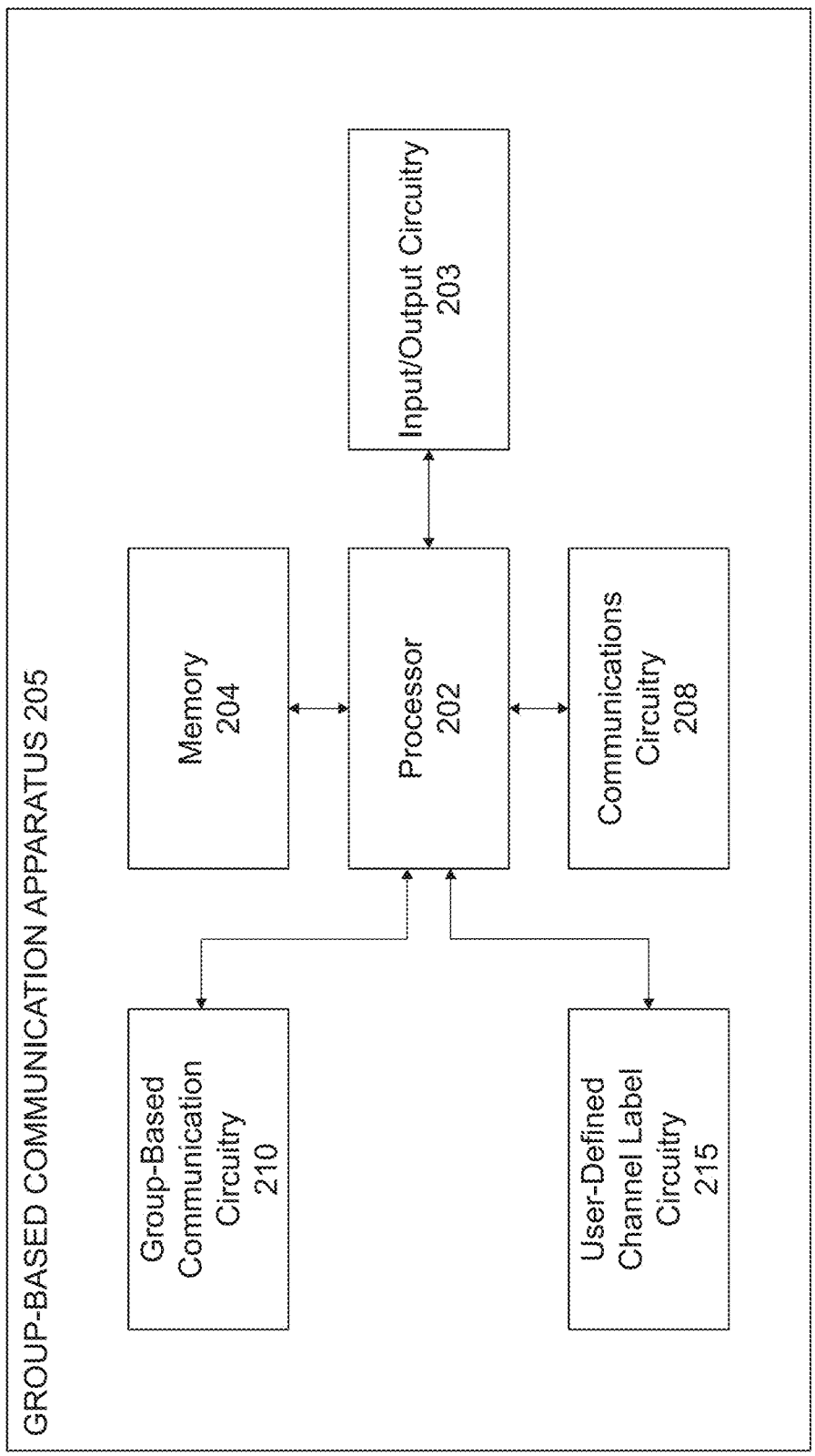
FIG. 2 shows a schematic view of a group-based communication apparatus according to one embodiment.

The group-based communication apparatus 205 may be embodied by one or more computing systems, such as group-based communication apparatus 205 shown in FIG. 2. The group-based communication apparatus 205 may include a processor 202, a memory 201, input/output circuitry 203, communications circuitry 208, group-based communication circuitry 210, and user-defined channel label circuitry 215. The apparatus 205 may be configured, using one or more of the circuitry 203, 208, 210, and 212, to execute the operations described herein.

Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 205 may provide or supplement the functionality of particular circuitry. For example, the processor 202 may provide processing functionality, the memory 201 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the group-based communication apparatus 205 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As just one example, the processor 202 may be configured to maintain one or more communication channels connecting a plurality of client devices 108A-108N (shown in FIG. 1) to enable message sharing therebetween. The processor 202 ensures that messages intended for exchange between the client devices 108A-108N within the particular communication channel are properly disseminated to those client devices 108A-108N for display within respective display windows provided via the client devices 108A-108N.

Moreover, the processor 202 may be configured to synchronize messages exchanged on a particular communication channel with a database for storage and/or indexing of messages therein. In certain embodiments, the processor 202 may provide stored and/or indexed messages for dissemination to client devices 108A-108N. The processor 202 may also provide to distribute such stored and/or indexed messages across various group-based communication workspaces and associated group-based communication channels as discussed herein.

In some embodiments, the group-based communication apparatus 200 may include input/output circuitry 203 that may, in turn, be in communication with processor 202 to provide output to the user and, in some embodiments, to receive an indication of a user input. The input/output circuitry 203 may comprise a user interface (e.g., a group-based communication interface) and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 208 may be any means such as a device or circuitry embodied in either hardware or a combination of hardware and software that is configured to receive and/or transmit data from/to a network and/or any other device, circuitry, or module in communication with the group-based communication apparatus 205. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 210 includes hardware and software configured to support a group-based communication system 200. The group-based communication circuitry 210 may utilize processing circuitry, such as the processor 202, to perform these actions. The group-based communication circuitry 210 may send and/or receive data from group-based communication repository 206. In some implementations, the sent and/or received data may be group-based communication objects (e.g., messages, files, links, etc.) organized among a plurality of group-based communication channels. It should also be appreciated that, in some embodiments, the group-based communication circuitry 210 may include a separate processor, specially configured field programmable gate array (FPGA), or application specific interface circuit (ASIC).

The user-defined channel label circuitry 215 includes hardware and software configured to support user-defined label related functionality, features, and/or services of the group-based communication system 200. The user-defined channel label circuitry 215 may utilize processing circuitry, such as the processor 202, to perform these actions. The user-defined channel label circuitry 215 may send and/or receive data from group-based communication repository 206. In some implementations, the sent and/or received data may be user defined channel labels, user-defined channel label identifiers, and associated data that is configured for association with one or more group-based communication channels. It should also be appreciated that, in some embodiments, the user-defined channel label circuitry 215 may include a separate processor, specially configured field programmable gate array (FPGA), or application specific interface circuit (ASIC).

It is also noted that all or some of the information discussed herein can be based on data that is received, generated and/or maintained by one or more components of the group-based communication apparatus 205. In some embodiments, one or more external systems (such as a remote cloud computing and/or data storage system, one or more external resources 110A-110N) may also be leveraged to provide at least some of the functionality discussed herein.

As described above and as will be appreciated based on this disclosure, embodiments of the present disclosure may be configured as methods, mobile devices, frontend graphical user interfaces, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

FIG. 3A depicts an example group-based communication interface 300 structured in accordance with various embodiments of the invention. The depicted group-based communication interface 300 comprises a sidebar pane 305 and a message pane 308. The sidebar pane 305 includes a permitted group-based communication channel set 310 arranged vertically as shown. The depicted permitted group-based communication channel set 310 is arranged (e.g., alphabetically) in the sidebar pane 305 based on respective group-defined titles 320.

The depicted permitted group-based communication channel set 310 includes those private group-based communication channels and public group-based communication channels to which the user accessing the depicted group-based communication interface 300 has been granted access by the group-based communication system. The depicted permitted group-based communication channel set 310 represents only a small subset of group-based communication channels supported by the group-based communication workspace to which the accessing user is a member.

Each group-defined title 320 of the permitted group-based communication channel set 310 represents a user-engageable link configured for accessing group-based communication objects (e.g., messages, files, etc.) associated with respective group-based communication channels. Once a user clicks on, engages, touches, or otherwise selects a group-defined title link, any messages associated with the selected group-based communication channel are rendered to the message pane 308. Other group-based communication objects (e.g., files, images, apps, etc.) are accessible through the message pane 308 or links embedded within the message pane 308.

The depicted group-defined titles 320 were established at creation of their respective group-based communication channels so that all members of a group-based communication workspace could identify and navigate to content (e.g., group-based communication objects) associated with the group-based communication channel. The group-defined titles were created based on a group-wide nomenclature so that group members could readily understand the purpose of the associated group-based communication channel. The depicted group-defined titles 320 were also designed with length (e.g., word length, word count, etc.) and similar restrictions given sidebar pane display limitations. In various embodiments, each group-defined title is stored to a group-based communication channel profile of a group-based communication repository. Importantly, a group-based communication channel is assigned only one group-defined title so that the group-defined title can serve as a consistent identifier for the associated group-based communication channel.

Figure 3B:
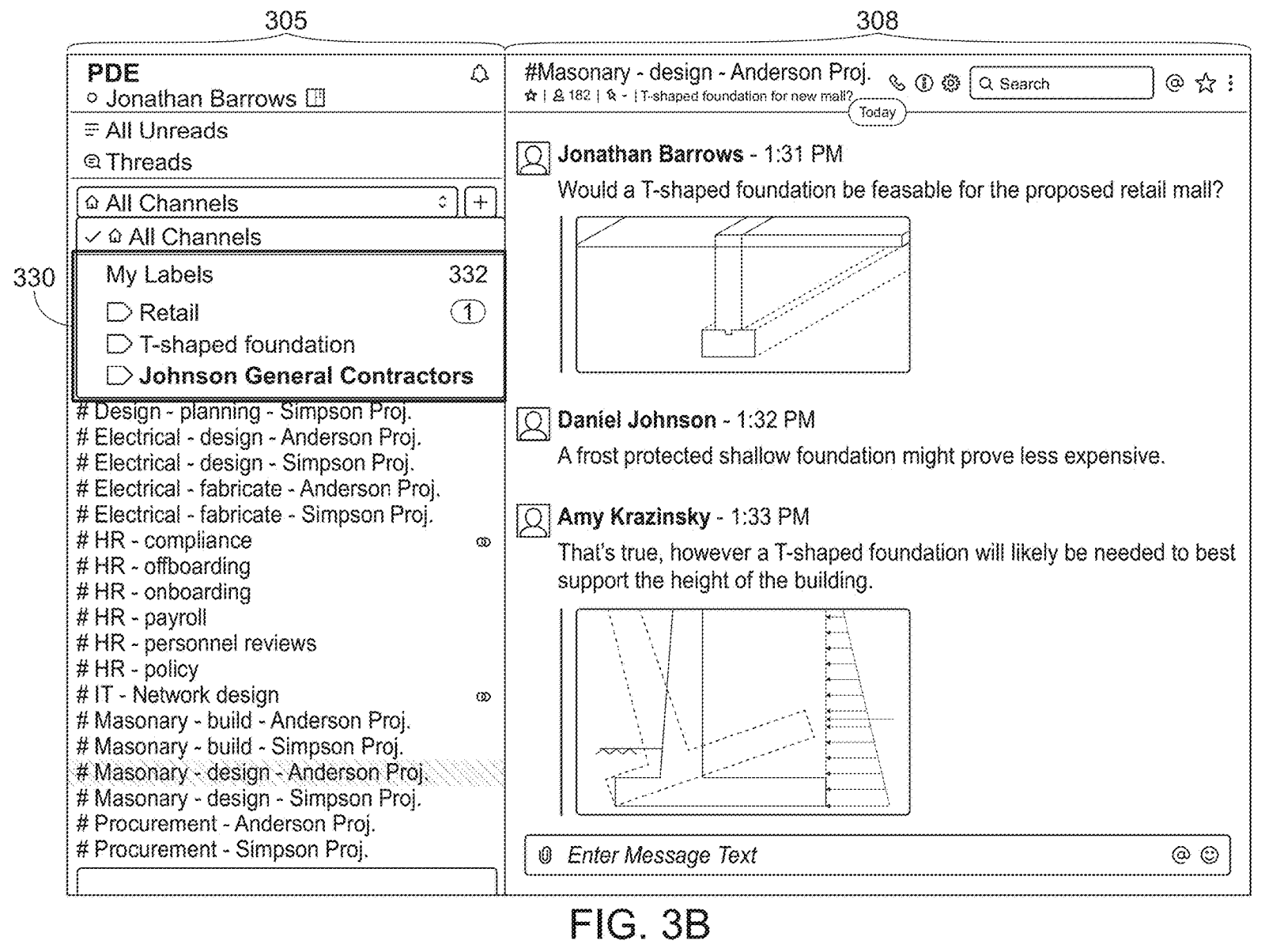

FIG. 3B depicts the group-based communication interface 300 of FIG. 3A; however, in the depicted embodiment, the group-based communication interface 300 has been configured to include a sidebar label focus interface component 330. In some embodiments, the sidebar label focus interface component 330 is revealed and/or accessed once a user clicks on a "My Labels" interface element (not shown) that is accessible from the depicted All Channels drop-down menu. The depicted sidebar label focus interface component 330 comprises a list of user-defined channel labels (e.g., Retail, T-shaped foundation, Johnson General Contractors) as shown. The depicted user-defined channel labels embody features, topics, members, or descriptors that an authoring user found relevant to one or more of the permitted group-based communication channels to which such authoring user is a member. The depicted sidebar label focus interface component 330 includes a label notification element 332 that is configured to signify to a user that the user has been tagged or flagged in a message (or other group-based communication object) found in one or more group-based communication channels associated with the indicated user-defined channel label.

Figure 3C:
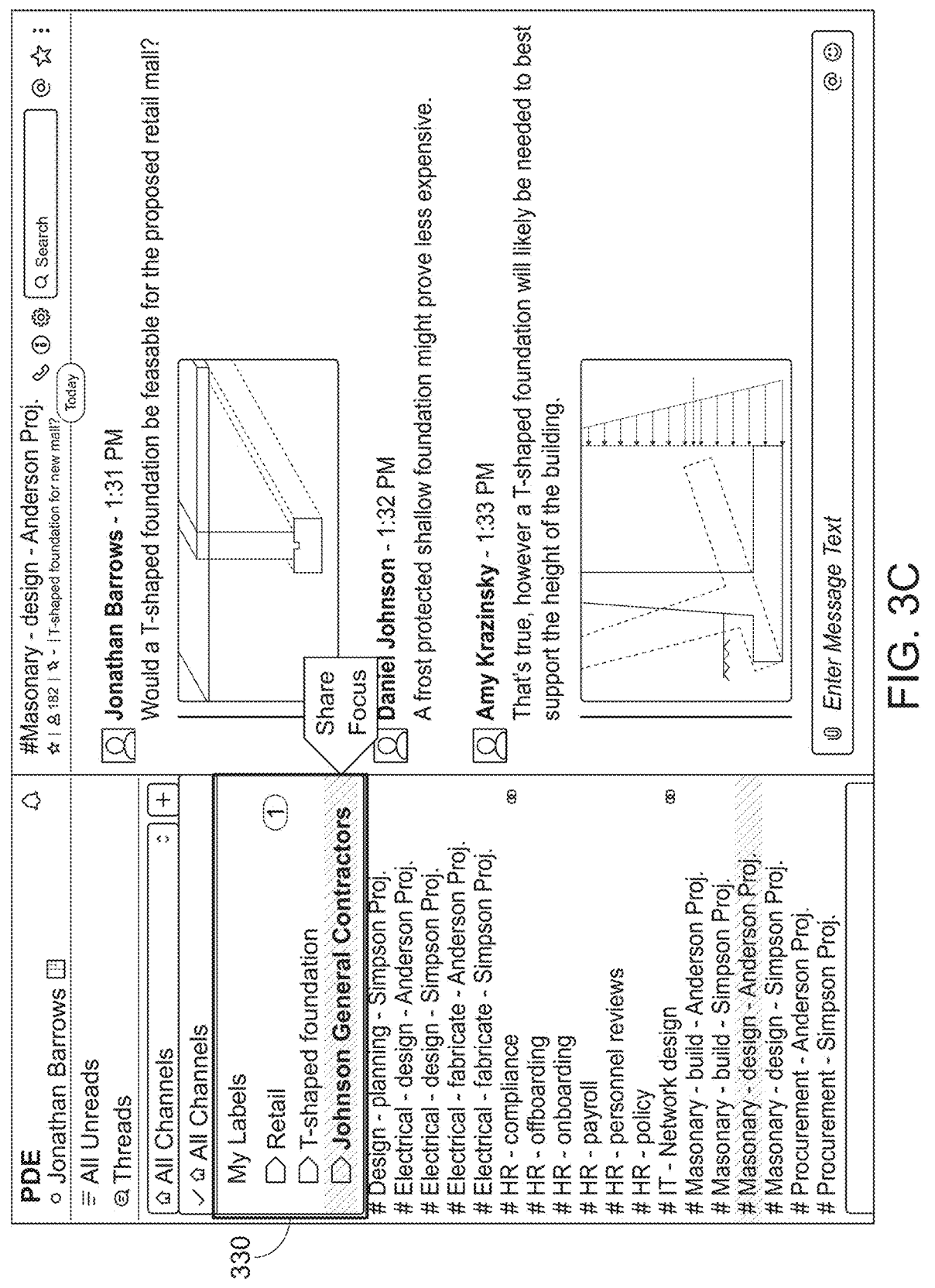

The depicted sidebar label focus interface component 330 is positioned within the sidebar pane 305 of the group-based communication interface 300 but is a distinct user interface element from the permitted group-based communication channel set. Each user-defined channel label listed in the sidebar label focus interface component 330 is engageable (e.g., clickable, selectable, etc.,) by a user as illustrated in FIG. 3C. Once a user clicks on or otherwise engages a selected user-defined channel label, the user-defined channel label circuitry prompts the user to initiate either a user-defined label share request or a sidebar label focus request. In the depicted embodiment, the user-defined channel label circuitry facilitates this decision via a pop-out type selection interface as shown. Here, the user is asked to choose between a "share" command and a "focus" command.

Figure 3D:
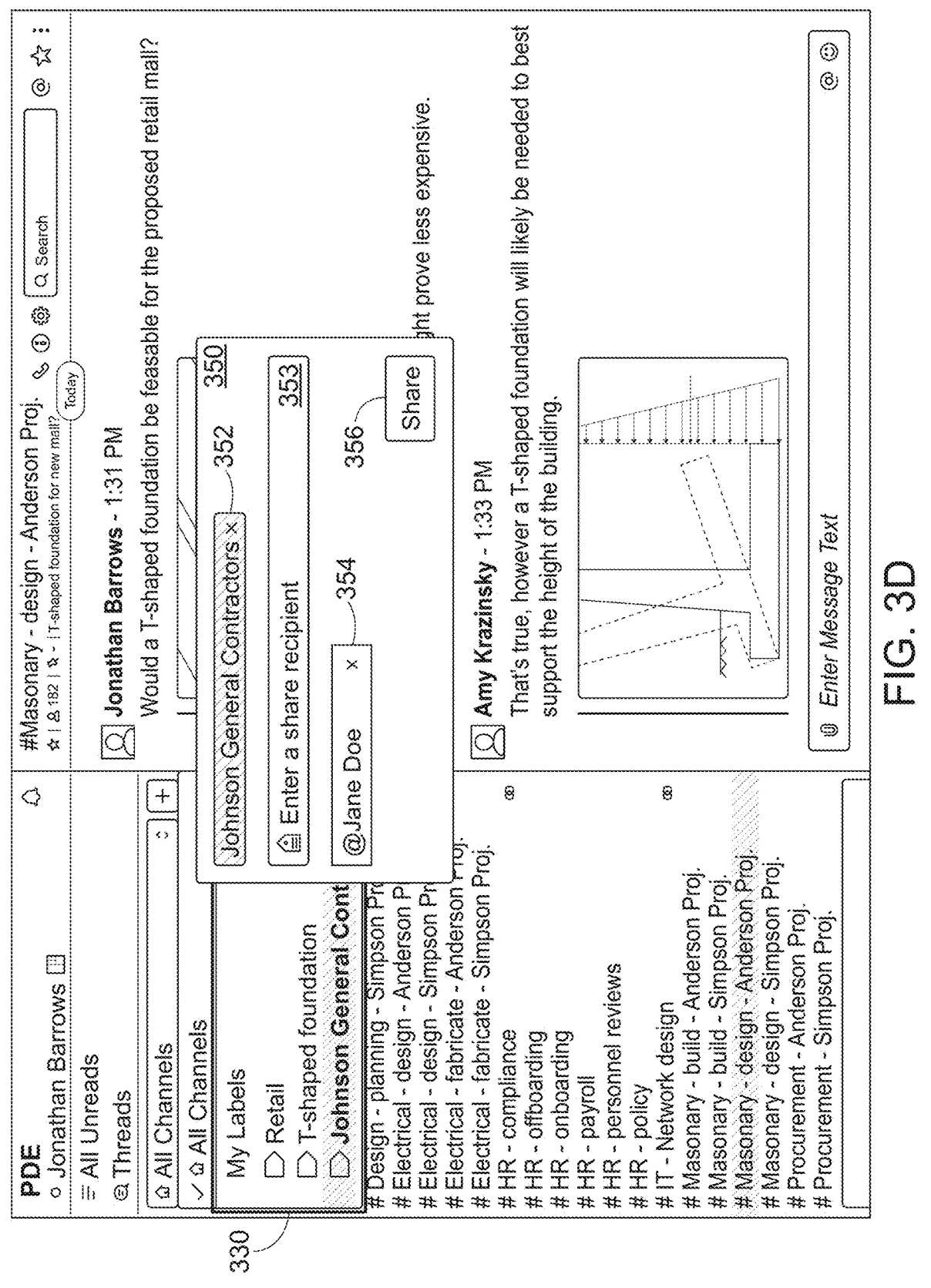

Upon selection of the "share" command, the user-defined channel label circuitry updates the group-based communication interface to cause rendering of a label share recipient identification interface 350 as shown in FIG. 3D. The depicted label share recipient identification interface 350 comprises a user-defined channel label 352, a label share recipient entry interface 353, a label share recipient 354 and a label share execution element 356. In the depicted embodiment, an example user is preparing to share the user-defined channel label "Johnson General Contractors" with a colleague named Jane Doe. The user entered Ms. Doe's unique name or email address into the label share recipient entry interface 353 and pressed enter to generate the depicted label share recipient 354 card. Other label share recipients may be added using the same process to produce additional label share recipient 354 cards. Once all desired label share recipient cards have been added, the user executes the share command by engaging the label share execution element 356 to produce a user-defined channel label share request.

User-defined channel label share requests structured in accordance with various embodiments of the present invention include an author identifier, a user-defined channel label identifier associated with a user-defined channel label (e.g., Johnson General Contractors) that has been selected for sharing, and a share recipient identifier (e.g., a unique name or number indicated a user profile associated with Jane Doe).

The user-defined channel label share request configured to cause transmission of a user-defined channel label share message to a second client device associated with the share recipient identifier (e.g., Jane Doe's client device). User-defined channel label share messages structured in accordance with various embodiments of the present invention comprise the author identifier and the user-defined channel label identifier.

Figure 3E:
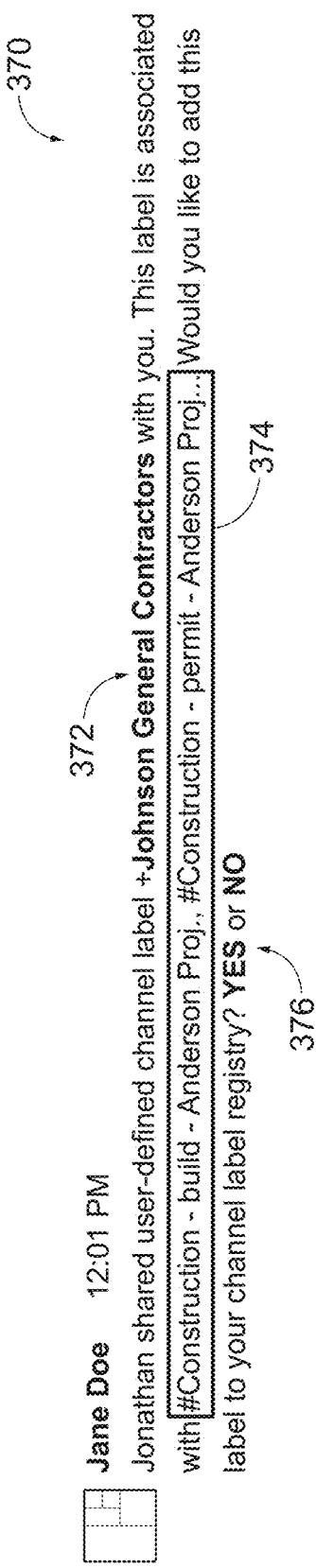
FIG. 3E shows an example label share receipt interface configured according to one embodiment.

In the depicted embodiment, upon receipt of the user-defined channel label share message, the second client device is caused, by the user-defined label circuitry, to generate the label share receipt interface 370 shown in FIG. 3E. The depicted label share receipt interface 370 includes a label share preview interface element 372, a label-focused shared channel set 374, and a label share acceptance interface 376. The label share receipt interface 370 is adapted to invite Jane Doe to consider the shared user-defined channel label ("Johnson General Contractors"). Should Ms. Doe wish to launch a preview of the shared user-defined channel label, she need only engage the label share preview interface element 372 as shown.

In the depicted embodiment, the label share receipt interface 370 lists some or all of the group-based communication channels associated with the shared user-defined channel label (e.g., #Construction—build—Anderson Proj., #Construction—permit—Anderson Proj., . . . ). However, in other embodiments, group-based communication channels may not be listed in the label share receipt interface 370. Jane Doe may cause the shared user-defined channel label to be stored to a channel label identifier repository associated with her user identifier (i.e., the share receipt identifier) by accepting user-defined channel label share request using the label share acceptance interface 376.

Put in the context of the operations of a group-based communication apparatus, the above described user-defined channel label share process proceeds as follows: receive a user-defined channel label share request comprising the author identifier, the user-defined channel label identifier, and a share recipient identifier; cause transmission of a user-defined channel label share message to a second client device (i.e., the client device of Ms. Doe) associated with the share recipient identifier (i.e., Ms. Doe's user identifier), wherein the user-defined channel label share message comprises the author identifier and the user-defined channel label identifier; receive a user-defined channel label share confirmation from the second client device associated with the share recipient identifier; and in response to receiving the user-defined channel label share confirmation, cause storage of the user-defined channel label identifier to a channel label identifier repository associated with the share recipient identifier.

The newly stored user-defined channel label identifier may then be used to identify a second label-focused channel set from the permitted group-based communication channels associated with Ms. Doe. Such second label-focused channel set may be rendered to the sidebar pane of a group-based communication interface displayed by the second client device associated with Ms. Doe.

Figure 4:
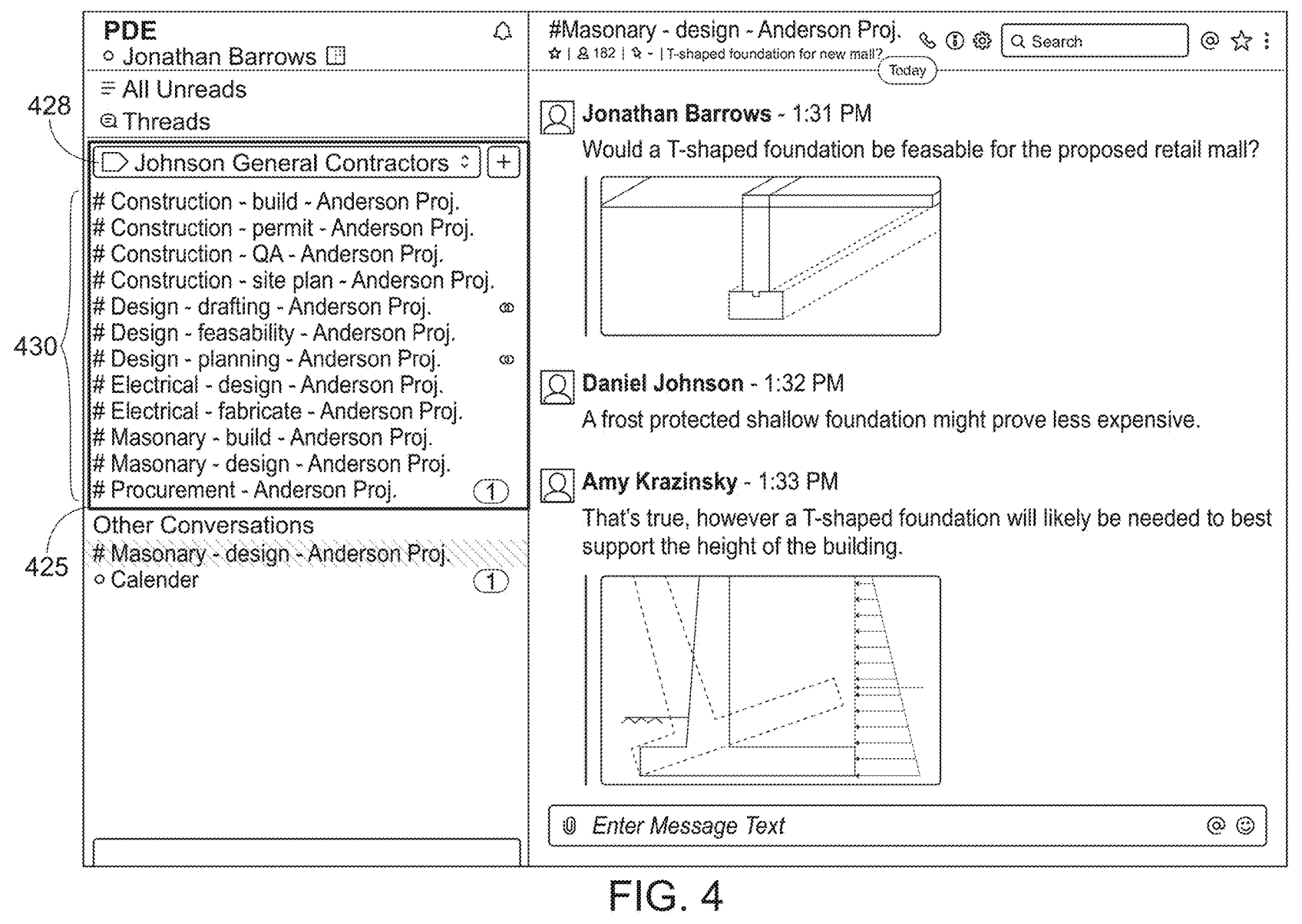

Returning to FIG. 3C, a user may initiate a "focus" command by engaging the depicted pop-out type selection interface. The user-defined label circuitry is thus configured to cause rendering of a label-focused channel set interface 425 of the type shown in FIG. 4. The depicted label-focused channel set interface 425 comprises a label selector interface 428 and a label-focused channel set 430. The depicted label-focused channel set 430 comprises a subset of the permitted group-based communication channels that the viewing user has been granted access to. This subset is identified by the user-defined channel label circuitry, in the depicted embodiment, because each of the indicated channels has been tagged (e.g., associated in the group-based communication repository) with the user-defined channel label "Johnson General Contractors".

In the depicted embodiment, the group-based communication channels shown within the label-focused channel set 430 are organized alphabetically based on their respective group-defined titles. In other embodiments, such channels may be arranged based on other criteria such as: recent access by the viewing user, most recent channel messaging activity, viewing user relevance, and the like. Group-based communication channels shown within the label focused channel set 430 may be bolded to indicate recent activity and notification badges may be used to indicate tagging or flagging of a viewing user.

Figure 5:
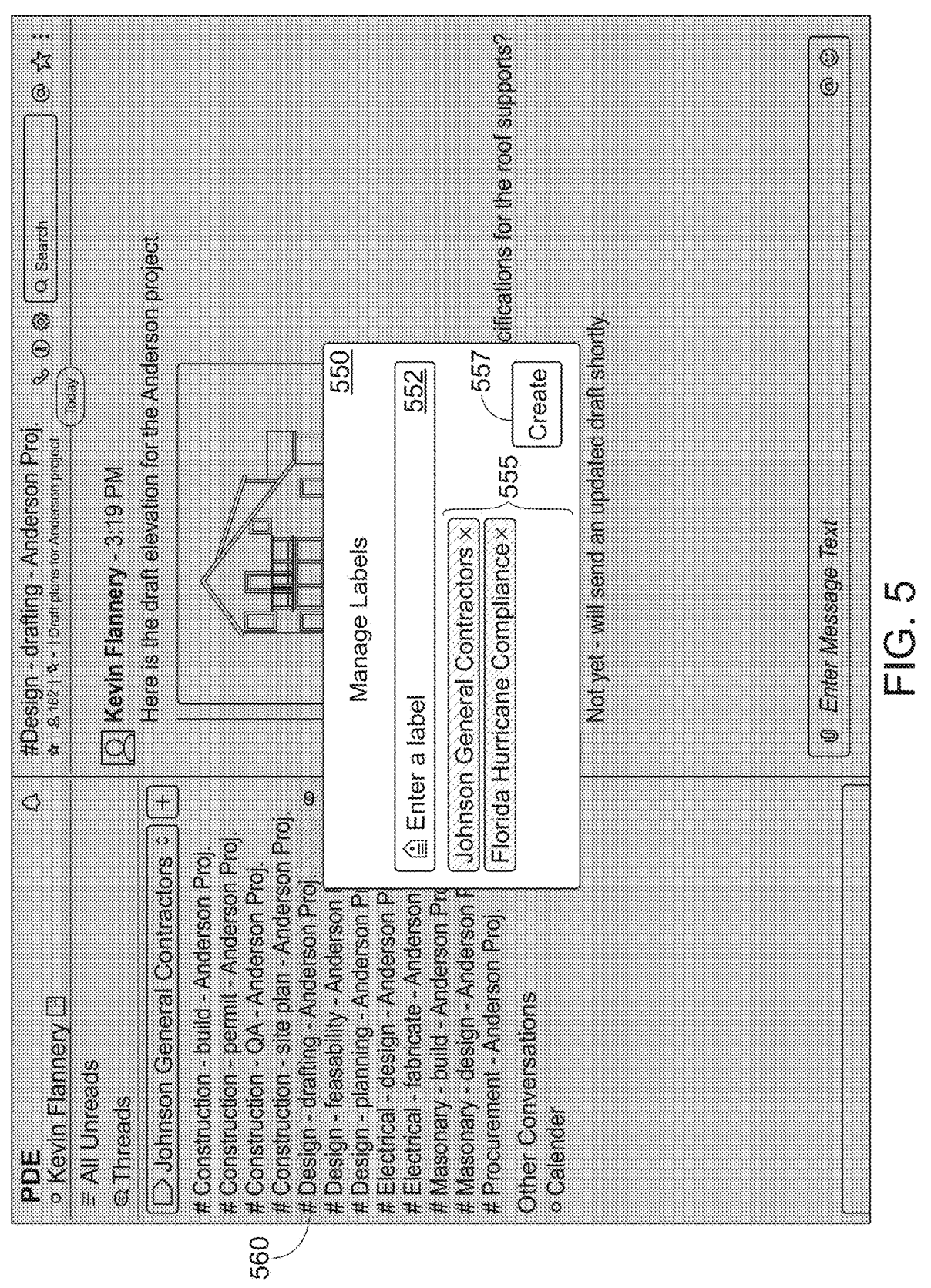

FIG. 5 depicts an example user-defined label creation interface 550. The depicted user-defined label creation interface 550 may be generated when a user engages a group-based communication interface to add or create a new user-defined channel label for tagging a selected group-based communication channel 560. Here, an authoring user is intending to add one or more user-defined labels to the "#Design—drafting—Anderson Proj" selected group-based communication channel 560.

The depicted user-defined label creation interface 550 comprises a label entry interface 552, a channel-focused label set 555, and a label create execution element 557 as shown. In the depicted embodiment, the authoring user entered the user-defined label text string "Florida Hurricane Compliance" into the label entry interface 552 to generate the first user-defined channel label included within the channel-focused label set 555. The authoring user then entered the user-defined label text string "Johnson General Contractors" into the label entry interface 552 to generate the second user-defined channel label included within the channel-focused label set 555. As the name suggests, multiple user-defined channel labels (whether pre-existing or newly created) may be added to the channel-focused label set 555 via the user-defined label creation interface 550. Once all desired user-defined channel labels are added to the channel-focused label set 555 an authoring user simply engages the label create execution element 557 to create the desired user-defined channel labels and associate them to the selected group-based communication channel.

More particularly, engagement of the label create execution element 557 creates a user-defined label selection command comprising the user-defined label text string(s), the author user identifier, and a group-based communication channel identifier associated with the selected group-based communication channel, and causes the user-defined channel label circuitry to determine a user-defined channel label identifier or set of user-defined channel label identifiers for association with text string and/or the other data associated with the user-defined label selection command. The user-defined channel label identifier(s) are then stored to a channel label identifier repository (e.g., a repository associated with or accessible to the group-based communication repository) in association with the author user identifier and the selected group-based communication channel identifier.

In embodiments where a pre-existing user defined channel label identifier is being added to a new group-based communication channel, the label create execution element 557 creates a label add command. The label add command comprises the user-defined channel label identifier, the user identifier, and a new group-based communication channel identifier associated with the new group-based communication channel. In response to the label add command, the user-defined channel label circuitry is configured to store the user-defined channel label identifier to the channel label identifier repository associated with the user identifier and the new group-based communication channel identifier.

Importantly, unlike group-defined titles and their one-to-one relationships to respective group-based communication channels, group-based communication systems structured in accordance with various embodiments of the present invention are configured to enable a many-to-one relationship between user-defined channel labels and a selected group-based communication channel. Each group-based communication channel may be assigned two, three, ten, or more labels by each channel member (i.e., an authoring user). Given that each group-based communication channel may have dozens of member users, this could translate into dozens or even hundreds of user-defined channel labels being assigned to a selected group-based communication channel.

In some embodiments, upon generating a new user-defined channel label as discussed above, group-based communication systems as described herein are configured to receive additional sidebar label focus requests comprising a user-defined channel label identifier associated with the new user-defined channel label. The group-based communication system then identifies a new label-focused channel set of the plurality of permitted group-based communication channels based on the new user-defined channel label identifier and causes rendering of the new label-focused channel set to the sidebar pane of the group-based communication interface.

In some embodiments, the group-based communication system is configured to remove rendering of a label-focused channel set from the sidebar pane of a group-based communication interface upon receiving a sidebar default request. For example, a user may return the sidebar drop-down menu to an All Channels position (as shown in FIG. 3A) to generate such a sidebar default request, which in turn causes the group-based communication system to render the plurality of permitted group-based communication channels to the sidebar pane based on the group-defined titles for the plurality of permitted group-based communication channels.

The user-defined label creation interface 550 depicted in FIG. 5 may also be used to assign a pre-existing user-defined channel label to a newly selected group-based communication channel. For example, should an authoring user wish to add an already existing user-defined channel label (e.g., "Retail") from the "#Design—planning—Anderson Proj" group based communication channel to the selected "#Design—drafting—Anderson Proj" group-based communication channel, such user need only begin typing "r . . . e . . . t . . . a . . . i . . ." into the label entry interface 552. The group-based communication system is configured to query the channel label identifier repository of known user-defined channel labels associated with the authoring user and to make potential auto-complete suggestions based on a typed input string. In this way, the group-based communication system is configured to enable an authoring user to add pre-existing user-defined channel labels to the channel-focused label set 555 and ultimately to store user-defined channel label identifiers associated with such labels to a channel label identifier repository (e.g., a repository associated with or accessible to the group-based communication repository) in association with an author user identifier and the selected group-based communication channel identifier as described above.

Importantly, unlike group-defined titles and their one-to-one relationships to respective group-based communication channels, group-based communication systems structured in accordance with various embodiments of the present invention are configured to enable a many-to-one or many-to-many relationships between a selected set of group-based communication channels and user-defined channel labels. Each user-defined channel label may be assigned to two, three, ten, or more group-based communication channels by each channel member (i.e., an authoring user). Given that each group-based communication channel may have dozens of member users, this could translate into dozens or even hundreds of user-defined channel labels being assigned to dozens or hundreds of group-based communication channels (i.e., a labeled set) of a given group-based communication workspace.

Figure 6A:
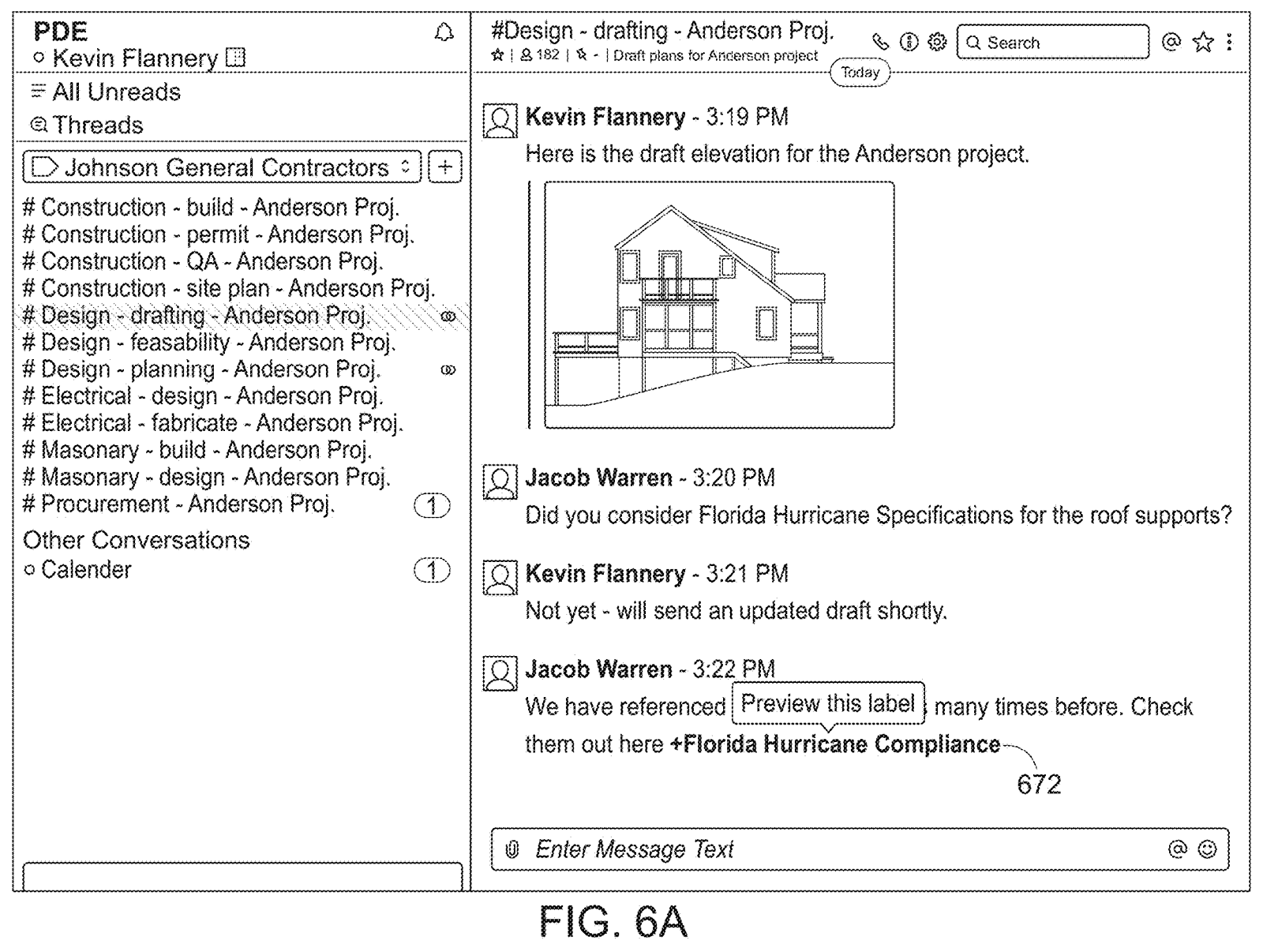

FIG. 6A depicts a group-based communication interface adapted to illustrate another form of user-defined channel label sharing. In the depicted embodiment, a user-defined channel label is shared to one or more members of a group-based communication workspace by simply adding a label share preview interface element 672 to a message displayed or posted within the message pane of a group-based communication interface. The depicted label share preview interface element 672 includes a "+" visual indicator to signify to a viewing user that a user-defined channel label is available for previewing.

Figure 6B:
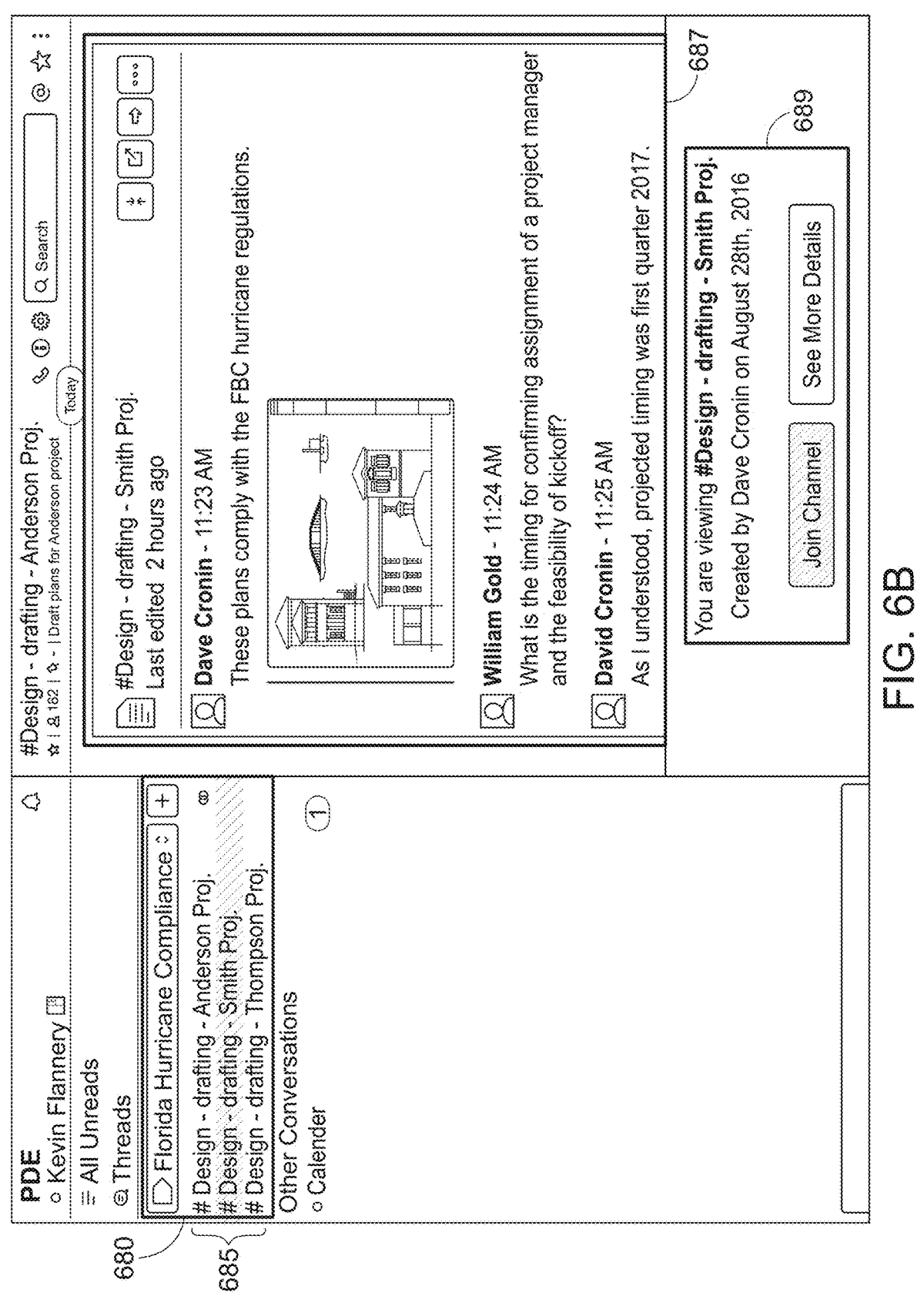

The group-based communication interface is configured to allow interested group-based communication channel members to simply mouse-over, click on, or otherwise engage the depicted label share preview interface element 672 to preview the indicated user-defined channel label. In such embodiments, the group-based communication interface is updated for the previewing user to include a preview label-focus interface component 680 as shown in FIG. 6B. The depicted preview label-focus interface component 680 comprises a preview label-focused channel set 685 as shown. The preview label-focused channel set 685 includes all group-based communication channels associated with the previewed user-defined channel label (e.g., "Florida hurricane compliance" in the present illustration).

In the depicted embodiment, a previewing user has selected a group-based communication channel ("#Design—drafting—Smith Proj") from among the preview label-focused channel set 685 to preview. Importantly, in the depicted embodiment, the preview label-focus interface component 680 is adapted to include group-based communication channels beyond those to which a previewing user has been granted access (i.e., it includes all label associated channels from a given workspace and not only those drawing from the permitted group-based communication channels). In this regard, the depicted embodiment is configured to render preview channel message content 687 (e.g., message content from a group-based communication channel that the previewing user has not yet joined) within the message pane of the group-based communication interface. The depicted embodiment includes a preview channel acceptance interface 689 to confirm if a previewing user wishes to join the previewed group-based communication channel.

In some embodiments, share recipients (e.g., Ms. Doe as discussed above in connection with FIGS. 3D-3E above) are enabled by the group-based communication system to create new user-defined channel labels that are retained privately or configured for access by an authoring user of the originally shared user-defined channel label. For example, in the context of operations performed by a group-based communication apparatus of the group-based communication system, the group-based communication apparatus may be configured to: cause rendering of a second plurality of permitted group-based communication channels (i.e., those accessible to Ms. Doe) to a second sidebar pane of a second group-based communication interface based on the group-defined titles; cause rendering of a second user-defined label selection interface component in association with the rendering of the second permitted group-based communication channels; receive a second user-defined label selection command in response to user engagement with the second user-defined label selection interface component, the second user-defined label selection command comprising a second user-defined label text string, the share recipient identifier, and a second selected group-based communication channel identifier associated with at least one of the second permitted group-based communication channels; determine a second user-defined channel label identifier for association with the second user-defined label text string; and cause storage of the second user-defined channel label identifier (i.e., associated with a new label created by Ms. Doe) to a second channel label identifier repository associated with the share recipient identifier and the second selected group-based communication channel identifier.

In some embodiments, the second user-defined channel label identifier may be stored to the channel label identifier repository associated with the original sharing user. In this way, user-defined channel labels created or added by Ms. Doe can be shared with other authoring users.

FIG. 7 depicts a user-defined channel label management interface 725 structured in accordance with one embodiment of the invention. The depicted user-defined channel label management interface 725 comprises a user-defined channel label set 730 as shown. The user-defined channel label management interface 725 further comprises label-focused channel counts 745 for each respective user-defined channel label identifier 735 of the user-defined channel label set 730. Channel types 755 and label-focused channel notification settings 765 are also provided for each user-defined channel label identifier 735.

The depicted user-defined channel label management interface 725 is configured to allow a user to review and configure all user-defined channel label identifiers 735, associated label-focused channel counts 745, channel types 755, and notification settings 765 associated with such user-defined channel label identifiers 735. In this way, the group-based communication system is adapted to allow greater user configuration of group-based communication channels and user-defined channel labels.

Figure 8:
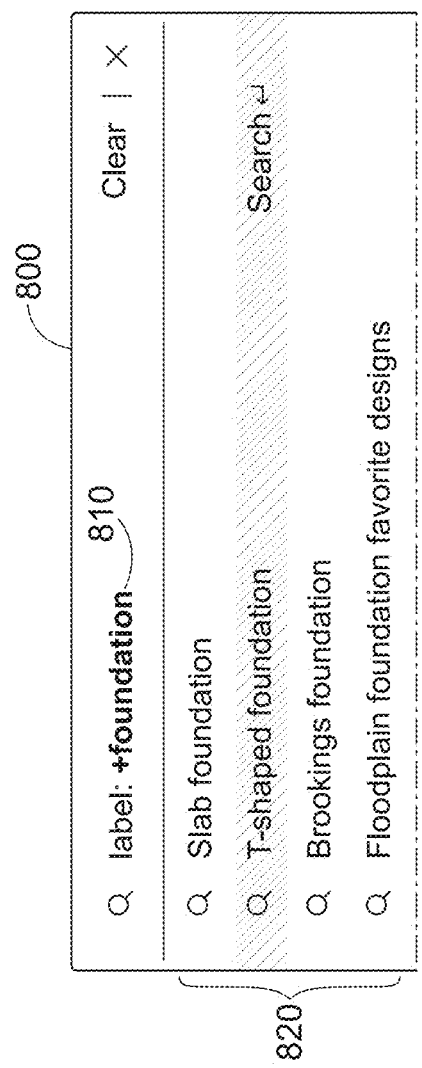
FIG. 8 shows an example group-based communication interface comprising a user-defined label search interface configured in accordance with one embodiment.

FIG. 8 depicts a user-defined label search interface 800 structured according to one embodiment. The depicted user-defined label search interface 800 comprises a label search entry interface 810 and a label search results interface 820. The depicted user-defined label search interface 800 is configured to allow users of a given group-based communication workspace to search for user-defined channel labels that have been shared or otherwise published to other workspace members. Indeed, a user may simply type a text string (e.g., a user-defined label query term) into the depicted label search entry interface 810 as shown. The user-defined channel label circuitry identifies a permitted group-based communication channel set associated with the searching user and queries a user-defined channel label set associated with the permitted group-based communication channel set based on the user-defined label query term. This query returns a query-focused label identifier results set and associated user-defined channel labels are displayed to the label search results interface 820. Upon user selection of one of the user-defined channel labels displayed to the label search results interface 820, the user-defined channel label circuitry is configured to cause rendering of a label-focused channel set to a sidebar pane of the group-based communication interface.

Figure 9:
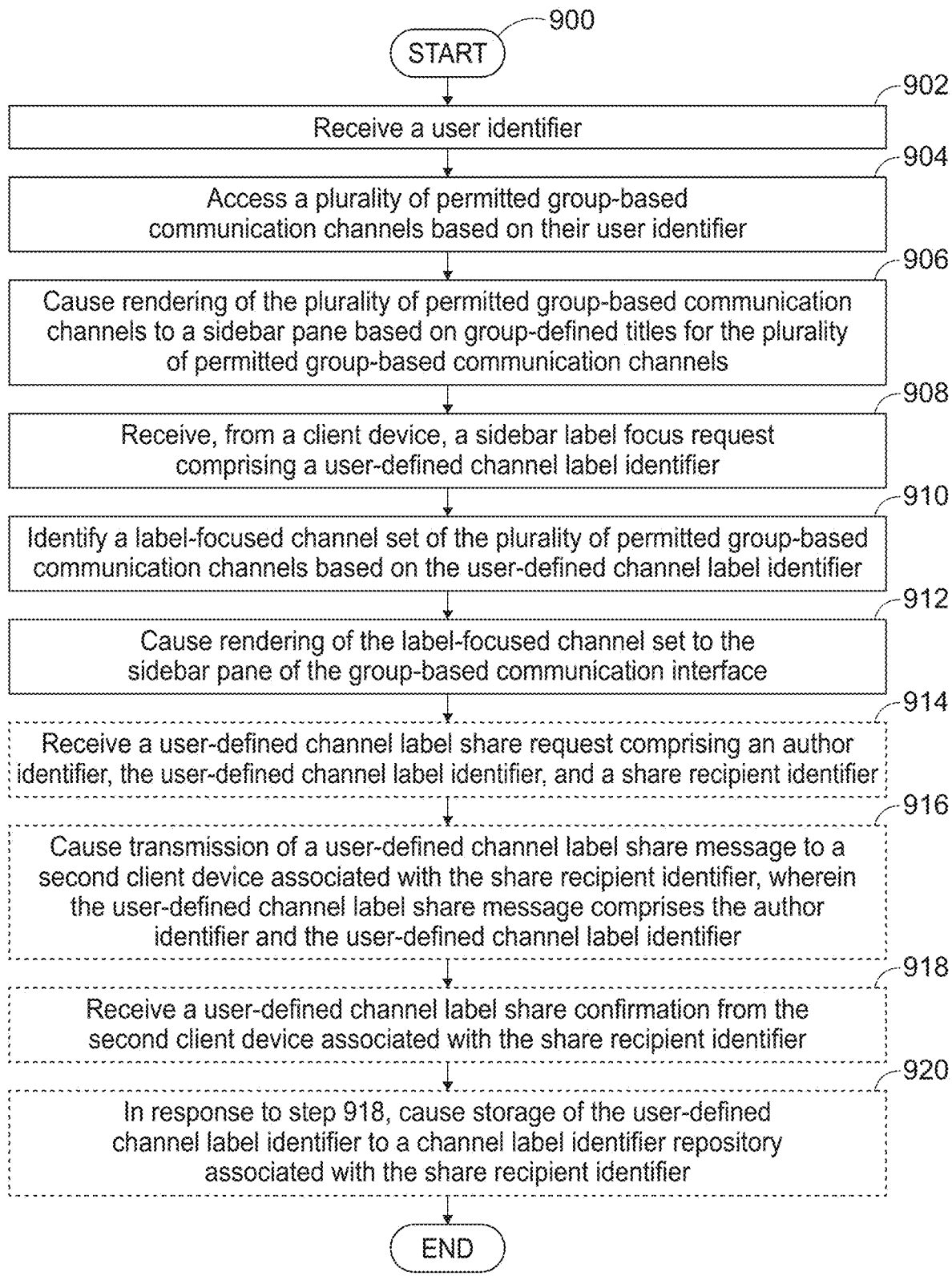
FIG. 9 is a flowchart illustrating example steps for causing rendering of a label-focused channel set to a sidebar pane of a group-based communication interface.

A group-based communication apparatus, using user-defined channel label circuitry, may proceed to manage group-based communication channels of a group-based communication interface in accordance with the process blocks of the flowchart 900 of FIG. 9. The depicted process begins at Block 902 where the group-based communication apparatus receives a user identifier. In one embodiment, the user identifier is received upon a user login to a software application of the group-based communication system.

At Block 904, the group-based communication apparatus accesses a plurality of permitted group-based communication channels based on the user identifier. For example, the group-based communication apparatus may retrieve an array of group-based communication channel identifiers from a user account (or other channel identifier repository) associated with the user identifier. The group-based communication apparatus causes rendering of the plurality of permitted group-based communication channels to a sidebar pane of a group-based communication interface at Block 906. For example, a permitted group-based communication channel set on the type shown in FIG. 3A may be rendered to the sidebar pane of a group-based communication interface rendered to a client device of a user associated with the user identifier. The plurality of permitted group-based communication channels are organized within the sidebar pane based on group-defined titles.

At Block 908, the group-based communication apparatus receives, from the client device associated with the user identifier, a sidebar label focus request comprising a user-defined channel label identifier. As discussed in connection with FIGS. 3C and 4, a sidebar label focus request is created upon user engagement of a sidebar label focus interface component (i.e., triggering a "focus" command via a selection interface). In the depicted embodiment, the sidebar label focus request comprises a user-defined channel identifier associated with the user-defined channel label "Johnson General Contractors".

At Block 910, the group-based communication apparatus identifies a label-focused channel set of the plurality of permitted group-based communication channels based on the user-defined channel label identifier. For example, if a given user had access to 137 permitted group-based communication channels, the group-based communication apparatus may identify the 7 group-based communication channels of the 137 that are associated with the user-defined channel label identifier "Johnson General Contractors" and designate those 7 as the label-focused channel set. Group-based communication channel identifiers for the 7 group-based communication channels of the label-focused channel set are used to render the label-focused channel set to the sidebar pane of the group-based communication interface at Block 912.

In some embodiments, a user may wish to share a user-defined channel label with another user. As discussed in connection with FIGS. 3C-3E, a user may generate a user-defined channel label share request by engaging a sidebar label focus interface component (i.e., triggering a "share" command via a selection interface) to generate a label share recipient identification interface. The user then enters a share recipient to generate the user-defined label share request comprising an author identifier, the user-defined channel label identifier, and a share recipient identifier. The group-based communication apparatus receives the user-defined label share request at Block 914.

At Block 916, the group-based communication apparatus is configured to cause transmission of a user-defined channel label share message to a second client device associated with the share recipient identifier, wherein the user-defined channel label share message comprises the author identifier and the user-defined channel label identifier. In such embodiments, the second client device associated with the second user identifier may be configured to render a label share receipt interface of the type shown in FIG. 3E and one or more preview interfaces of the types shown in FIGS. 6A and 6B.

In circumstances when the second user accepts the user-defined channel label share request (i.e., indicating a willingness to have the shared user-defined channel label identifier stored to a channel label identifier repository associated with her user identifier), the second user simply engages the label share acceptance interface of FIG. 3E. Upon doing so, the group-based communication apparatus receives a user-defined channel label share confirmation from the second client device associated with the second user (i.e., the share recipient identifier) at Block 918. The group-based communication apparatus is then configured to cause storage of the user-defined channel label identifier to a channel label identifier repository associated with the share recipient identifier at Block 920.

Figure 10:
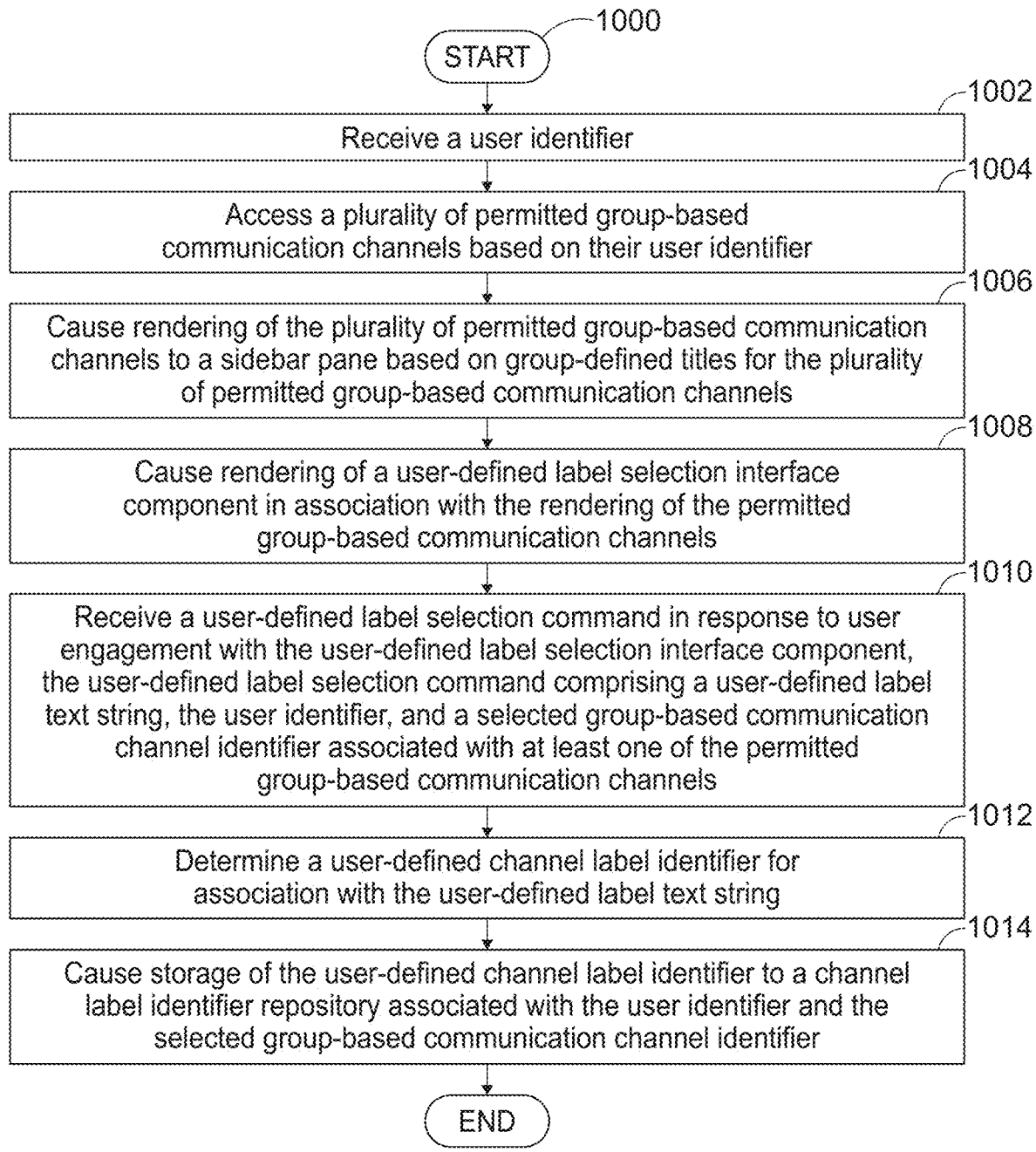
FIG. 10 is a flowchart illustrating example steps for generating and storing a user-defined channel label identifier for access by a group-based communication system.

The group-based communication apparatus is configured to allow users to create user-defined channel labels in accordance with the process blocks of the flowchart 1000 of FIG. 10. The depicted process begins at Block 1002 where the group-based communication apparatus receives a user identifier. In one embodiment, the user identifier is received upon a user login to a software application of the group-based communication system.

At Block 1004, the group-based communication apparatus accesses a plurality of permitted group-based communication channels based on the user identifier. For example, the group-based communication apparatus may retrieve an array of group-based communication channel identifiers from a user account (or other channel identifier repository) associated with the user identifier. The group-based communication apparatus causes rendering of the plurality of permitted group-based communication channels to a sidebar pane of a group-based communication interface at Block 1006. For example, a permitted group-based communication channel set on the type shown in FIG. 3A may be rendered to the sidebar pane of a group-based communication interface rendered to a client device of a user associated with the user identifier. The plurality of permitted group-based communication channels are organized within the sidebar pane based on group-defined titles.

Should the user wish to create or assign a user-defined label to one or more of the permitted group-based communication channels, such user simply engages a label interface (not shown) associated with a selected permitted group-based communication channel causing rendering of a user-defined label selection interface component. In one embodiment, the user-defined label selection interface component is the user-defined label creation interface shown in FIG. 5. Once the user has added all desired user-defined labels for associated with the selected permitted group-based communication channel, a user-defined label selection command is transmitted from the client device to the group-based communication apparatus at Block 1010. The user-defined label selection command comprises a user-defined label text string, the user identifier, and a selected group-based communication channel identifier associated with the selected permitted group-based communication channel.

At Block 1012, the group-based communication apparatus determines a user-defined channel label identifier for association with the user-defined label text string. The group-based communication apparatus then causes storage of the user-defined channel label identifier to a channel label identifier repository associated with the user identifier and the selected group-based communication channel identifier at Block 1014.

Generating a Work Graph of Group-Based Communication Objects

Group-based communication objects may be stored in one or more database storage areas of the group-based communication repository 206 during applicable data indexing procedures. Moreover, such group-based communication objects may be stored as entries of a graphical database (or a relational database providing similar functionality for illustrating relationships between group-based communication objects, or any of a variety of other database storage structures for providing similar data storage configurations), providing data illustrative of generated relationships between various group-based communication objects. Those relationships between group-based communication objects may be generated based at least in part on metadata and body content data generated and appended to various group-based communication objects, and user-defined channel label data.

The relationships between group-based communication objects define a work graph illustrating relationships among a plurality of group-based communication objects, which may be usable by one or more artificial intelligence-based search systems for identifying a plurality of inter-related group-based communication objects to be presented in response to a particular search query. In certain embodiments, group-based communication objects stored within a work graph are each characterized by their own access credentials/requirements. Accordingly, some group-based communication objects within the work graph may only be accessible to a select group of users (e.g., a single user), whereas other group-based communication objects within the same work graph may be accessible to a larger/different group of users (e.g., all users associated with a particular group-based communication workspace). Despite these differences in accessibility between various group-based communication objects within a common work graph, relationships established between various group-based communication objects may be usable to establish topics for various group-based communication objects, for establishing a particular user's expertise, to determine relatedness of group-based communication objects for search queries, and/or the like.

For each group-based communication object, the group-based communication repository 206, the group-based communication apparatus 205, or other components of the group-based communication platform 105 may perform an analysis of the body contents and/or metadata and/or supplemental metadata generated by the group-based communication system 200 to determine other group-based communication objects deemed sufficiently relevant to illustrate a connection within the work graph. User-defined channel labels and their associated relationships to the group-based communication objects discussed herein add a valuable signal to be leveraged by the group-based communication system to inform any work graph data structure that is assembled to represent or otherwise embody a group-based communication object corpus.

Figure 11:
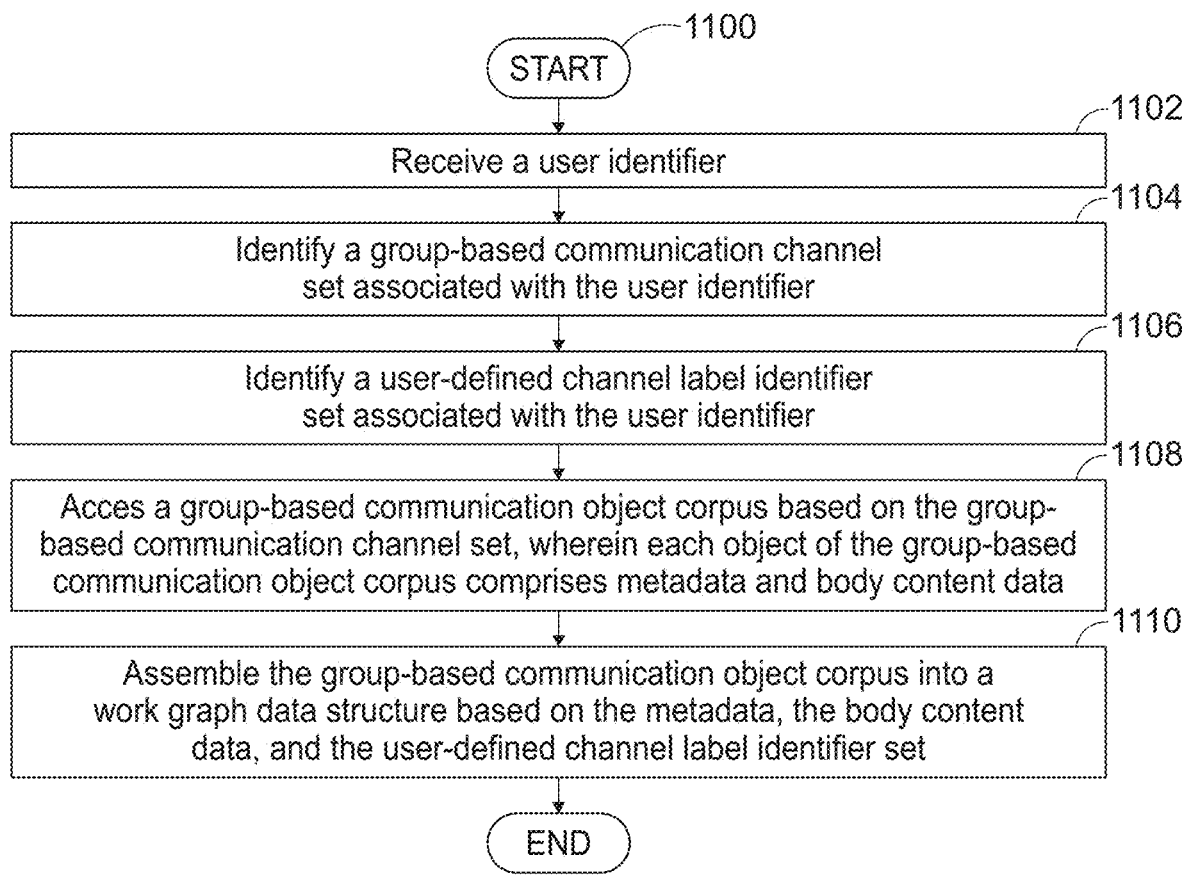
FIG. 11 is a flowchart illustrating example steps for assembling a work graph data structure from a group-based communication object corpus and a user-defined channel label identifier set in accordance with one embodiment.

An example process 1100 is shown in the flowchart of FIG. 11. As shown therein, the process 1100 may begin when the group-based communication apparatus receives a user identifier at Block 1102. The user identifier is used by the group-based communication apparatus to identify a group-based communication channel set associated with the user identifier at Block 1104. In the depicted embodiment, the group-based communication apparatus is configured to identify a user-defined channel label identifier set associated with the user identifier at Block 1106. The group-based communication apparatus is further configured to access a group-based communication object corpus based on the group-based communication channel set at Block 1108. Each group-based communication object of the group-based communication object corpus comprises metadata and body content data.

In various embodiments, the group-based communication apparatus is configured to determine each group-based communication object's relationship to other group-based communication objects based on the metadata, body content data, and the user-defined channel label identifier set. The group-based communication apparatus is thus configured to assemble the group-based object corpus into a work graph data structure at Block 1110.

In certain embodiments, the group-based communication apparatus may identify shared topics within metadata of one group-based communication object relative to other group-based communication objects; identify common sending user identifiers; identify common event participants (a greater number or percentage of shared participants may provide a stronger indicated relationship); identify common group-based communication object types; identify common intended recipients; identify temporal relationships between generation/transmission of group-based communication objects; identify common user-defined channel label identifiers; identify shared user-defined channel label identifiers; identify similar user-defined channel label identifiers; and/or the like.

As part of the operations of Block 1110, the group-based communication apparatus may establish weighted relationship scores between each of the group-based communication objects of the group-based communication object corpus. For example, stronger relationships (e.g., a higher number of shared characteristics), or certain types of relationships (e.g., as identified via a machine learning algorithm) may result in a higher relationship score between the analyzed group-based communication object and one or more other group-based communication objects. These relationship scores may be ranked (e.g., by direct comparison of relationship scores, by normalization of comparison scores on a shared scale (e.g., 0-1), and/or the like). In certain embodiments, those relationship scores satisfying a first degree score criteria (e.g., exceeding a score threshold) may be utilized to establish direct relationships between the analyzed group-based communication object and those other group-based communication objects having a sufficient relationship score. Those first degree scores may then be mapped within the work graph data structure (e.g., by establishing edges between data indicative of group-based communication objects within a graphical database, by providing data indicative of related group-based communication objects within data of a particular group-based communication object database entry within a relational database, and/or the like). The process of FIG. 11 may then be repeated for each user identifier of a given group-based communication workspace or set of group-based communication workspaces.

It should be understood that, in accordance with certain embodiments, relationships between various group-based communication objects may be symmetrical (e.g., the degree of relatedness of a first object to a second object is identical to the degree of relatedness of the second object to the first object). However, it should be understood that in other embodiments, the relationships between various group-based communication objects may be asymmetrical (e.g., the degree of relatedness of a first object to a second object is not identical to the degree of relatedness of the second object to the first object).

Although work graph data structures assembled as described herein may illustrate relationships between various group-based communication objects, the work graph data structures may also be utilized to determine relationships between users, between users and group-based communication channels, between users and topics, between group-based communication channels and topics, between group-based communication channels, between topics, between users and group-based communication objects, between group-based communication channels and group-based communication objects, between topics and group-based communication objects, and/or the like. Thus, the work graph data structure may be configured to establish relationships between group-based communication objects, and those relationships may be further utilized to identify relationships between other aspects of data utilized with the group-based communication apparatus (such as data indicative of particular users, channels, workspaces, and/or the like).

The group-based communication system (e.g., via the group-based communication repository 206, via the group-based communication apparatus 205, and/or the like) utilizes the work graph data structure to generate a machine learning structure (e.g., a neural network) that may be utilized for executing search queries for users. For example, the group-based communication system may implement an unsupervised learning structure, a supervised learning structure, a reinforcement learning structure, a deep learning structure, and/or the like for utilizing relationships established via the work graph data structure to generate search results for various group-based communication objects.

In certain embodiments, a global machine learning algorithm may be utilized for all group-based communication objects stored at or accessible via the group-based communication platform system. In such embodiments, access to particular group-based communication objects (e.g., via a search query utilizing the machine-learning algorithm) may be limited based at least in part on access privileges of the searching user (e.g., a user may only be able to access group-based communication objects associated with permitted group-based communication channels). In other embodiments, machine learning algorithms may be established independently for each of a plurality of groups, such that training of the machine learning algorithm is based on group-based communication objects exchanged within the particular group alone.

The machine learning algorithms may be generated and/or updated periodically, to reflect changes within the work graph data structure that result from the addition and/or aging of group-based communication objects within the work graph data structure. Moreover, the machine learning parameters (including those parameters indicative of the underlying neural network of the machine learning algorithm) may be stored within the group-based communication repository.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A group-based communication apparatus configured to manage communication channels, the group-based communication apparatus comprising at least one processor and at least one memory, the at least one memory having computer-coded instructions therein, wherein the computer-coded instructions are configured to, in execution with the at least one processor, cause the group-based communication apparatus to:

receive, from a client device associated with a user, a first request to generate a user-defined label to be presented via an interface of the client device in association with at least one communication channel of the communication channels, the first request comprising a user identifier associated with the user and an indication of the at least one communication channel to be associated with the user-defined label;

store the user-defined label in association with the user identifier;

cause the user-defined label associated with the user identifier and at least one indicator associated with the at least one communication channel that is associated with the user-defined label to be rendered to a sidebar pane of the interface;

receive, from the client device, a second request to associate another communication channel of the communication channels with the user-defined label, wherein the second request comprises modifying a location of an indicator associated with the other communication channel from a first location associated with a subset of the communication channels that are not associated with the user-defined label to a second location associated with the user-defined label; and based at least in part on the second request, modify the sidebar pane of the interface to present the indicator associated with the other communication channel in association with the user-defined label and the at least one indicator associated with the at least one communication channel.

2. The group-based communication apparatus of claim 1, wherein the instructions further configure the group-based communication apparatus to:

cause ordering of the communication channels within the sidebar pane of the interface based on group-defined titles associated with the communication channels.

3. The group-based communication apparatus of claim 1, wherein the user-defined label comprises an author identifier matching the user identifier.

4. The group-based communication apparatus of claim 1, wherein the user-defined label comprises an author identifier that does not match the user identifier.

5. The group-based communication apparatus of claim 3, wherein the instructions further configure the group-based communication apparatus to:

receive a user-defined label share request comprising the author identifier, the user-defined label, and a share recipient identifier; and cause transmission of a user-defined label share message to a second client device associated with the share recipient identifier, wherein the user-defined label share message comprises the author identifier and the user-defined label.

6. The group-based communication apparatus of claim 5, wherein the instructions further configure the group-based communication apparatus to:

receive, from the second client device and based at least in part on the user-defined label share message, an indication of acceptance of the user-defined label; and in response to receiving the indication of acceptance of the user-defined label, cause the user-defined label to be stored in association with the share recipient identifier.

7. The group-based communication apparatus of claim 6, wherein the instructions further configure the group-based communication apparatus to:

receive, from the second client device, a third request to view one or more communication channels associated with the user-defined label; and cause the at least one indicator associated with the communication channel and the indicator associated with the other communication channel to be presented in a second sidebar pane of a second user interface associated with the second client device.

8. The group-based communication apparatus of claim 1, wherein the instructions further configure the group-based communication apparatus to:

in response to the first request, cause rendering of a user-defined label selection interface component via the interface; and receive a user-defined label text string representative of the user-defined label and the indication of the at least one communication channel via the user-defined label selection interface component.

9. The group-based communication apparatus of claim 1, wherein the instructions further configure the group-based communication apparatus to:

receive, from the client device, a sidebar default request; and cause rendering of indicators associated with the communication channels to the sidebar pane based on group-defined titles for the communication channels.

10. A computer implemented method for managing communication channels associated with a communication platform, the computer implemented method comprising:

receiving, from a client device associated with a user, a first request to generate a user-defined label to be presented via an interface of the client device in association with at least one communication channel of the communication channels, the first request comprising a user identifier associated with the user and an indication of the at least one communication channel to be associated with the user-defined label;

storing the user-defined label in association with the user identifier;

causing the user-defined label associated with the user identifier and at least one indicator associated with the at least one communication channel that is associated with the user-defined label to be rendered to a sidebar pane of the interface;

receiving, from the client device, a second request to associate another communication channel of the communication channels with the user-defined label, wherein the second request comprises modifying a location of an indicator associated with the other communication channel from a first location associated with a subset of the communication channels that are not associated with the user-defined label to a second location associated with the user-defined label; and based at least in part on the second request, modifying the sidebar pane of the interface to present the indicator associated with the other communication channel in association with the user-defined label and the at least one indicator associated with the at least one communication channel.

11. The computer implemented method of claim 10, further comprising:

causing ordering of the communication channels within the sidebar pane of the interface based on group-defined titles associated with the communication channels.

12. The computer implemented method of claim 10, wherein the user-defined label comprises an author identifier matching the user identifier.

13. The computer implemented method of claim 10, wherein the user-defined label comprises an author identifier that does not match the user identifier.

14. The computer implemented method of claim 12, further comprising:

receiving a user-defined label share request comprising the author identifier, the user-defined label, and a share recipient identifier; and causing transmission of a user-defined label share message to a second client device associated with the share recipient identifier, wherein the user-defined label share message comprises the author identifier and the user-defined label.

15. The computer implemented method of claim 14, further comprising:

receiving, from the second client device and based at least in part on the user-defined label share message, an indication of acceptance of the user-defined label; and in response to receiving the indication of acceptance of the user-defined label, cause the user-defined label to be stored in association with the share recipient identifier.

16. The computer implemented method of claim 15, further comprising:

receiving, from the second client device, a third request to view one or more communication channels associated with the user-defined label; and causing the at least one indicator associated with the communication channel and the indicator associated with the other communication channel to be presented in a second sidebar pane of a second user interface associated with the second client device.

17. The computer implemented method of claim 10, further comprising:

in response to the first request, causing rendering of a user-defined label selection interface component via the interface; and receiving a user-defined label text string representative of the user-defined label and the indication of the at least one communication channel via the user-defined label selection interface component.

18. The computer implemented method of claim 10, further comprising:

receiving, from the client device, a sidebar default request; and causing rendering of indicators associated with the communication channels to the sidebar pane based on group-defined titles for the communication channels.

19. A system associated with a communication platform, the system comprising:

one or more processors; and one or more computer readable media storing instructions that, when executed by the one or more processors, cause the system to perform operations comprising:

receiving, from a client device associated with a user, a first request to generate a user-defined label to be presented via an interface of the client device in association with at least one communication channel of the communication channels, the first request comprising a user identifier associated with the user and an indication of the at least one communication channel to be associated with the user-defined label;

storing the user-defined label in association with the user identifier;

causing the user-defined label associated with the user identifier and at least one indicator associated with the at least one communication channel that is associated with the user-defined label to be rendered to a sidebar pane of the interface;

receiving, from the client device and via the interface, a second request to associate another communication channel of the communication channels with the user-defined label, wherein the second request comprises modifying a location of an indicator associated with the other communication channel from a first location associated with a subset of the communication channels that are not associated with the user-defined label to a second location associated with the user-defined label view; and based at least in part on the second request, modifying the sidebar pane of the interface to present the indicator associated with the other communication channel in association with the user-defined label and the at least one indicator associated with the at least one communication channel.

20. The system of claim 19, wherein the operations further comprise:

causing ordering of the communication channels within the sidebar pane of the interface based on group-defined titles associated with the communication channels.

21. The system of claim 19, wherein the user-defined label comprises an author identifier matching the user identifier.

22. The system of claim 19, wherein the user-defined label comprises an author identifier that does not match the user identifier.

* * * * *